United States Patent
Kiyoki et al.

(10) Patent No.: US 6,347,315 B1
(45) Date of Patent: Feb. 12, 2002

(54) METHOD AND APPARATUS FOR SELECTING AND UTILIZING ONE OF COMPUTERS OR DATABASES

(75) Inventors: Yasushi Kiyoki, 1148-24, Nagakuni, Tsuchiura-shi, Ibaraki-ken; Takashi Kitagawa, 207-202, Namiki 2-chome, Tsukuba-shi, Ibaraki-ken; Teruyoshi Washizawa, Atsugi, all of (JP)

(73) Assignees: Canon Kabushiki Kaisha, Tokyo; Yasushi Kiyoki; Takashi Kitagawa, both of Ibaraki-ken, all of (JP)

( * ) Notice: Subject to any disclaimer, the term of this patent is extended or adjusted under 35 U.S.C. 154(b) by 0 days.

(21) Appl. No.: 09/207,022

(22) Filed: Dec. 8, 1998

(30) Foreign Application Priority Data

Dec. 12, 1997 (JP) .............................. 9-342710
Dec. 12, 1997 (JP) .............................. 9-342711

(51) Int. Cl.$^7$ .............................. G06F 17/30
(52) U.S. Cl. .............................. 707/5; 704/2
(58) Field of Search .............................. 707/1, 2, 3, 4, 707/5, 6; 704/1–2

(56) References Cited

U.S. PATENT DOCUMENTS

| | | | | |
|---|---|---|---|---|
| 5,678,039 A | * | 10/1997 | Hinks et al. ................. | 395/604 |
| 5,701,400 A | * | 12/1997 | Amado ......................... | 395/76 |
| 5,754,938 A | * | 5/1998 | Herz et al. .................. | 455/4.2 |
| 5,778,362 A | * | 7/1998 | Deerwester .................. | 707/5 |
| 5,899,995 A | * | 5/1999 | Millier et al. ............... | 707/102 |
| 5,926,812 A | * | 7/1999 | Hilsenrath et al. .......... | 707/5 |
| 5,987,446 A | * | 11/1999 | Corey et al. ................. | 707/3 |
| 6,029,195 A | * | 2/2000 | Herz ............................ | 709/219 |
| 6,052,693 A1 | * | 4/2001 | Smith et al. ................. | 707/104 |
| 6,243,703 B1 | * | 6/2001 | Couch et al. ................. | 707/10 |

FOREIGN PATENT DOCUMENTS

| | | |
|---|---|---|
| JP | 5-34213 | 12/1993 |
| JP | 7-65032 | 3/1995 |

\* cited by examiner

*Primary Examiner*—Thomas Black
*Assistant Examiner*—Mary Wang
(74) *Attorney, Agent, or Firm*—Fitzpatrick, Cella, Harper & Scinto

(57) ABSTRACT

In an information processing apparatus capable of communicating with a plurality of computer systems, an input interpreter separates an input character string from a user into commands and parameters, and a first degree of similarity calculating unit calculates the degree of similarity between context information representing the parameters and metadata of the computer systems. A second degree of similarity calculating unit revises the degree of similarity based upon the processing cost of a command. A command execution unit selects the computer system for which the revised degree of similarity is greatest, converts the input character string to language employed by the selected computer system, outputs the converted character string to the selected computer system and transmits the results obtained to a user terminal. Thus, a computer best suited to execution of processing can be selected from a plurality of computers connected by a network without requiring that the user make any designations.

28 Claims, 18 Drawing Sheets

FIG.12

| COMPUTER SYSTEM NAME | LANGUAGE INFORMATION ADDRESS |
|---|---|
| CS-1 | LANGUAGE 1 ADDRESS |
| CS-2 | LANGUAGE 6 ADDRESS |
| CS-3 | LANGUAGE 4 ADDRESS |
| CS-4 | LANGUAGE 1 ADDRESS |
| CS-5 | LANGUAGE 2 ADDRESS |
| CS-6 | LANGUAGE 4 ADDRESS |
| ... | ... |

FIG.13

| COST TABLE OF LANGUAGE 1 |
|---|
| LIBRARY OF LANGUAGE 1 |

| COMMAND NAME | COST |
|---|---|
| COMMAND 1 | 3 |
| COMMAND 2 | 1 |
| COMMAND 3 | 12 |
| ... | ... |

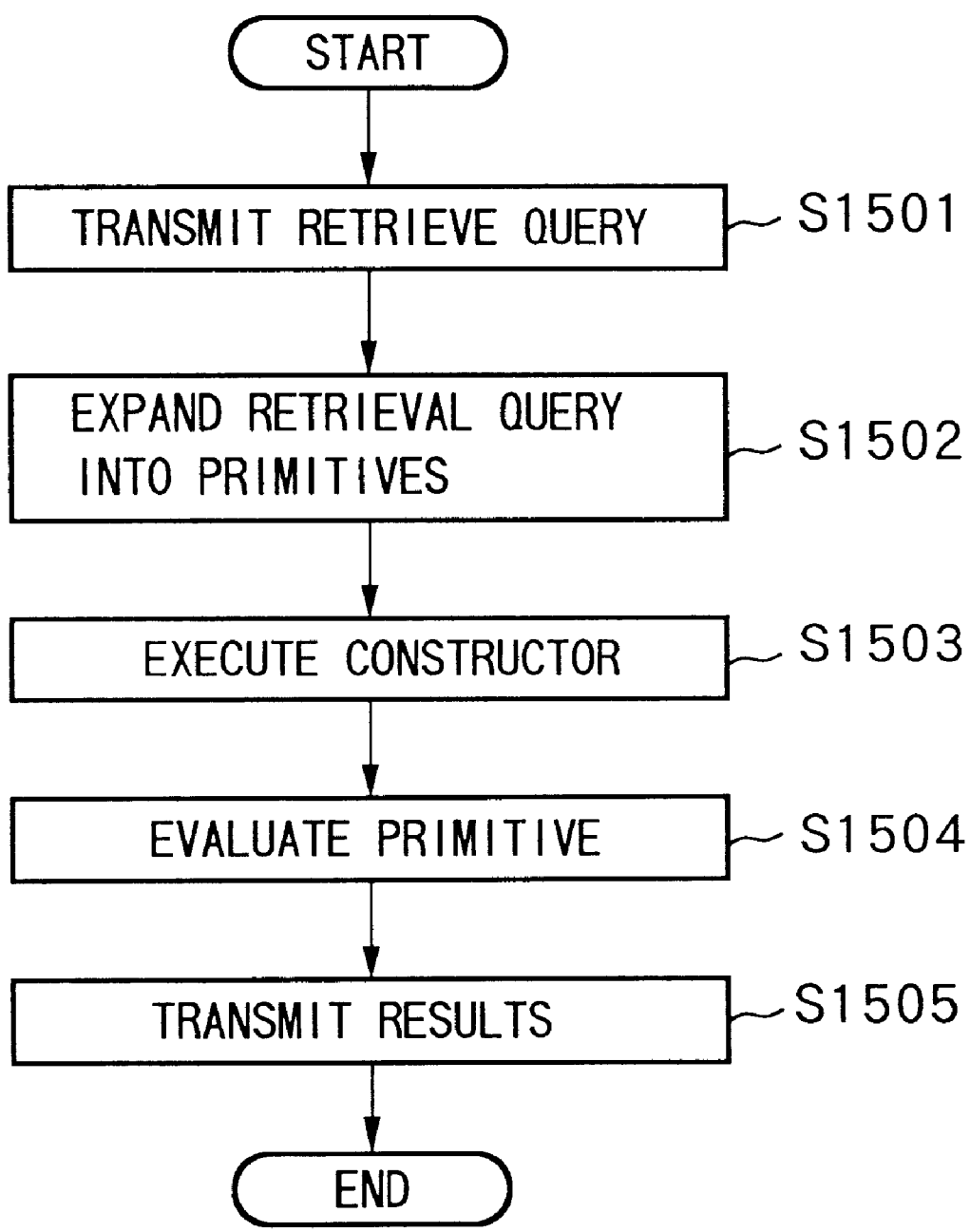

METHOD AND APPARATUS FOR SELECTING AND UTILIZING ONE OF COMPUTERS OR DATABASES

BACKGROUND OF THE INVENTION

This invention relates to an information processing apparatus and method. More particularly, the invention relates to an interface between a searcher and a multidatabase system, a system for integrating databases of different types and an ordinary database system, as well as a method of searching these databases.

The spread of computer networks has made possible to access a variety of databases from personal terminals. Databases accessible from a network are managed by management systems described in various languages. In order to access data from various databases, it is necessary that the user know the query formats of all of the relevant management systems. This places a large burden upon a user who is not accustomed to dealing with the databases. If it were possible to unify or integrate the data of different formats and meanings stored in these various databases, the utility value of the databases connected to the network would be greater.

To lighten the burden on the user, several techniques for integrating different databases have been proposed. For example, techniques through which computer systems constructed using different languages and environments are accessed by a user without the user needing to be aware of these languages and environments have been proposed and are referred to as multimedia databases and distributed computer systems, etc. The object of these techniques is to allow the user to search a plurality of databases described in different languages or storing the same data under different attribute names without requiring that the user be aware of these differences. Techniques necessary to attain this object can be classified roughly as techniques for (1) translation between database languages and (2) association of table names with attribute names.

A multidatabase system based upon a translation between database languages is implemented in a manner described below using the art described in the specification of Japanese Patent Application Laid-Open (KOKAI) No. 7-65032. In the description that follows, the query language that can be employed at a user terminal shall be referred to as "standard language", and the format for expressing the data shall be referred to as a "standard format". A multidatabase system is provided with the following libraries and table in advance:

(1) A language translation library for making a translation between the standard language used by a user terminal and a database language used by the database that is to be searched.

(2) A data conversion library for converting data expressed by the standard format to data having a format specific to each database, or vice versa.

(3) A management table for associating a database name with the corresponding language translation library and data conversion library.

According to the art described above, the user describes the name of the database to be searched and the query using the standard language. In response, the system obtains the number of the language translation library and the number of the data conversion library corresponding to the target database from the target database name using the management table. The system then converts the query described by the user using the standard language to the language employed by the target database using the language translation library and transmits the query in this language to the target database. When the result of the query is transmitted from the target database, the system converts the result to the standard language using the data conversion library and then transmits the result to the user in the standard language.

Another method of implementation is command transfer in a network system by a technique described in the specification of Japanese Patent Application Laid-Open (KOKAI) No. 5-342123. According to this system, a command sequence entered by the user is analyzed, a system in a computer network for executing the requested processing is decided and the command specified by the user is converted to a command that is supported by the system. Such a system can be applied to a multidatabase system if the command is considered to be a query statement and the searched system is considered to be a database management system.

The methods according to the prior art involve certain problems. First, with the system of Japanese Patent Application Laid-Open No. 7-65032, the name of the database to be searched must be specified. The method of Japanese Patent Application Laid-Open No. 5-342123 is such that in order to decide the system that is to execute processing on the basis of parameters set by the user, a file name, table name and attribute name serving as the parameters must be specified correctly.

In a case where a script described by the user is evaluated in the applicative order in accordance with the conventional methods, even procedures and data that play no part whatsoever in obtaining the final results requested by the user are evaluated (executed).

In the case of an ordinary program, the advantages of a compact interpreter outweigh the increase in amount of computation due to the execution of unnecessary evaluations. Evaluation in the applicative order, therefore, tends to be preferred. With a system in which distributed databases are integrated, however, the amount of network communication is an important evaluation item. Accordingly, using a communication channel to evaluate unnecessary procedures or data should be avoided to the maximum extent possible.

Furthermore, an optimization mechanism has been provided for commercial databases. Specifically,-in regard to a query obtained by combining partial queries, the mechanism reorders the applicative order of the queries so as to maximize processing speed. However, when an multidatabase system evaluates partial queries in the applicative order, the optimization mechanism with which each database is provided can no longer be utilized.

SUMMARY OF THE INVENTION

Accordingly, an object of the present invention is to make possible the utilization of a desired resource even if the computer having the resource is not accurately specified by the user.

Another object of the present invention is to arrange it so that if a resource that perfectly matches the content of a user input does not exist, it is possible to select and utilize a computer having a resource close to the desired resource.

Another object of the present invention is to arrange it so that when there are a plurality of computer candidates having resources, the candidate for which the cost of executing a command is smallest is utilized preferentially to make possible the efficient execution of processing.

Another object of the present invention is to make it possible to avoid the unnecessary evaluation of-procedures and data not needed to obtain the final result required by the user, thereby reducing traffic in data communication.

Another object of the present invention is to make possible a partial query to a database and to make possible the utilization of an optimization function of each database.

Another object of the present invention is to make the scheduling of primitives by an interpreter of primitives unnecessary, thereby simplifying interpreter design.

Another object of the present invention is to make it possible to select delayed evaluation based upon evaluation in the applicative order.

Another object of the present invention is to make it possible to execute the queries of a plurality of databases in parallel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram showing an example of a correspondence table which associates computer systems with language information addresses;

FIG. 13 is a diagram showing an example of language information;

FIG. 20 is a flowchart showing the flow of retrieval processing.

DESCRIPTION OF THE PREFERRED EMBODIMENTS

Preferred embodiments of the present invention will now be described in detail in accordance with the accompanying drawings.

First Embodiment

Figure 1:
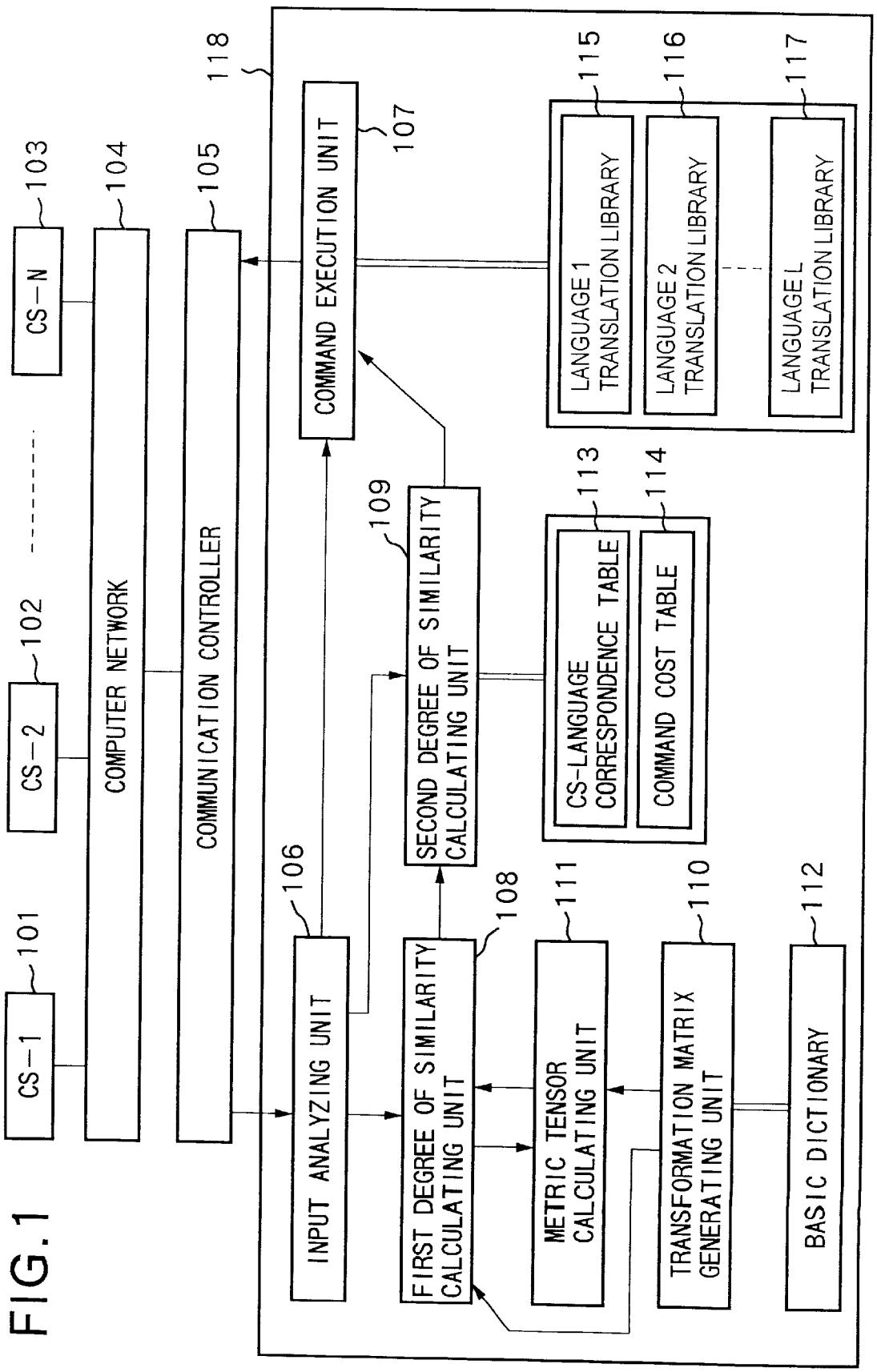
FIG. 1 is a functional block diagram of an information processing apparatus according to an embodiment of the present invention.

FIG. 1 is a diagram showing the functional construction of an information processing apparatus 118 according to a first embodiment of the present invention. As long as the components of the apparatus implement the functions described below, each component may be a device which includes a dedicated program memory and processor. Alternatively, a plurality of the functional components may be implemented by having the same CPU execute function programs that have been stored in a ROM or disk memory, etc., or a control program for controlling specific hardware that corresponds to each function.

Figures 14, 15:
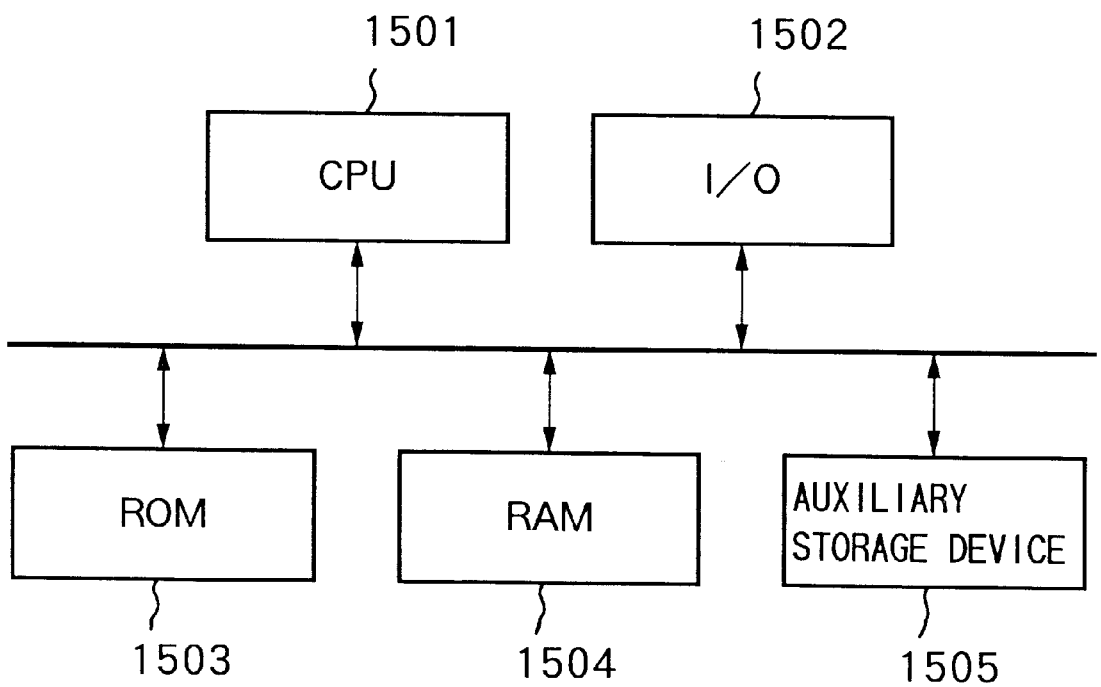
FIG. 14 is a diagram showing an example of a correspondence table which associates commands with costs.
FIG. 15 is a block diagram showing the hardware configuration of an information processing apparatus.

FIG. 15 is a block diagram showing the hardware configuration of the information processing apparatus 118, which functions as an integrated system of different databases.

The system of FIG. 15 includes a CPU 1501 for controlling each component of the system via a bus and for executing various programs; an input/output (I/O) unit 1502 which accepts a retrieval query from a user, sends the query to a database and receives the results; a ROM 1503 for storing fixed data and fixed programs; a RAM 1504 having a data area for temporarily storing data necessary for processing, such as input data from a user, internal variables and results of retrieval, and a program area for storing various programs loaded from an auxiliary storage device 1505; and the auxiliary storage device 1505 for storing various programs and tables using a storage medium such as a floppy disk or hard disk.

Figure 2:
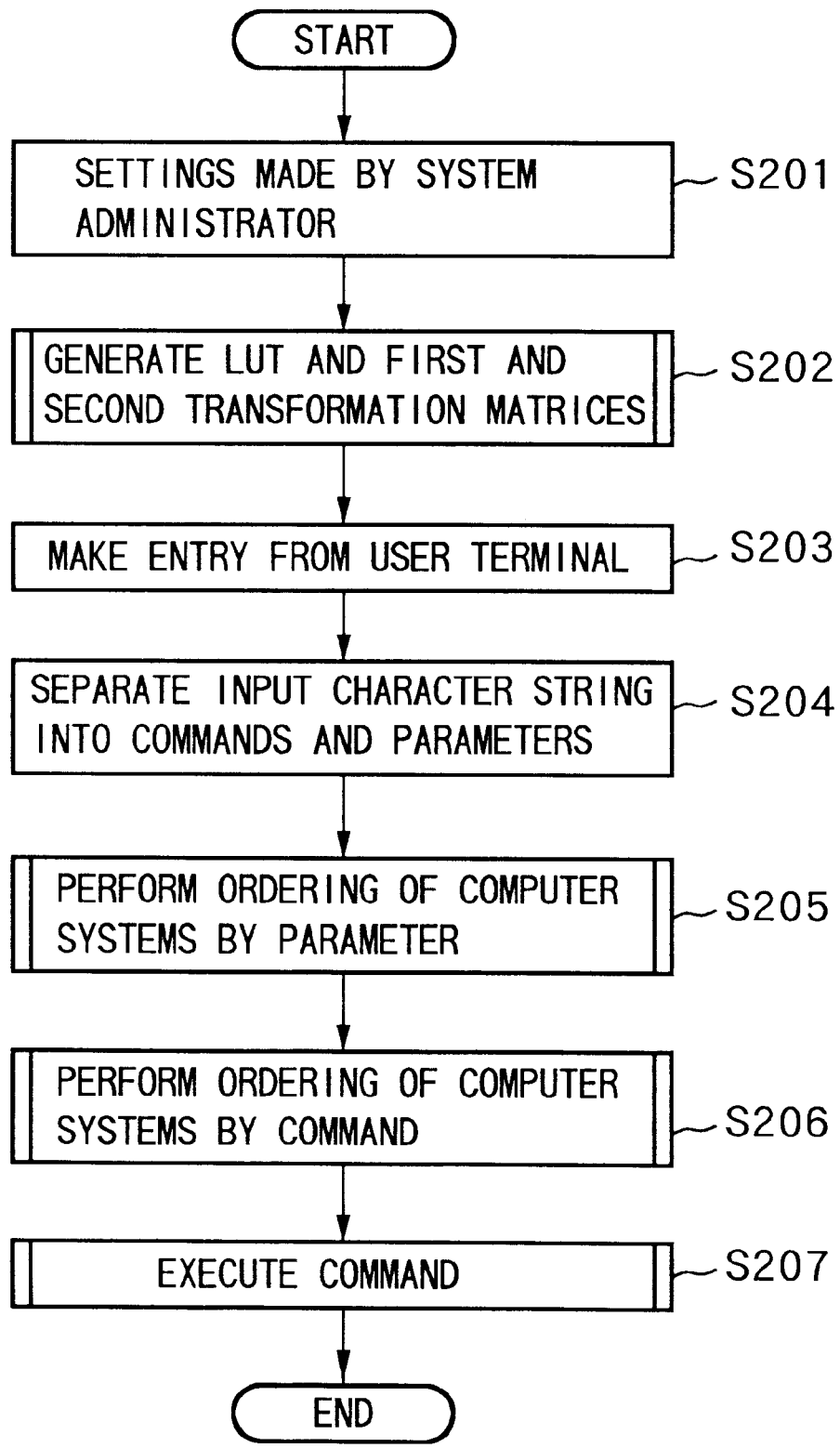
FIG. 2 is a flowchart illustrating processing executed by the information processing apparatus.

FIG. 2 is a flowchart of processing for integrating different databases implemented by the information processing apparatus 118.

At step S201 in FIG. 2, the system administrator provides a basic dictionary 112, metadata of resources contained in computer systems (CS) 101, 102, 103, a correspondence table giving the correspondence between computer systems and languages, a cost table 114 for associating, on a per-language basis, commands and costs for executing these commands, and language translation libraries 115, 116, 117.

This is followed by step S202, at which a transformation matrix generating unit 110 generates a LUT, a first transformation matrix (referred to as matrix A) and a second transformation matrix (referred to as matrix R) by a procedure described later with reference to FIG. 6.

Next, at step S203, a character string composed of commands and parameters is entered from a user terminal.

Then, at step S204, an input analyzing unit 106 analyzes the input character string to separate the string into the commands and parameters, transmits the parameters to a first degree of similarity calculating unit 108 and the commands to a second degree of similarity calculating unit 109.

Figure 4:
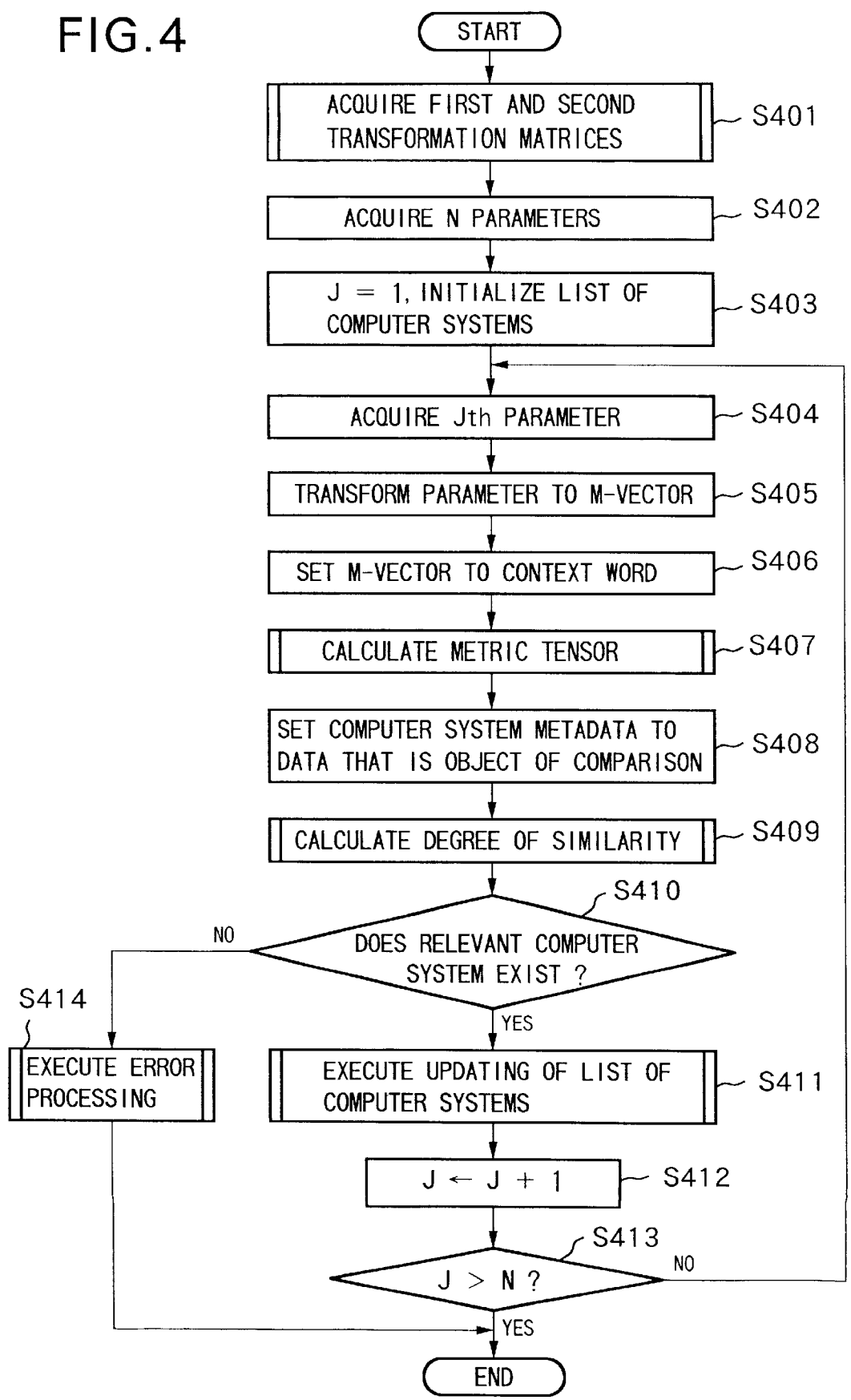
FIG. 4 is a flowchart illustrating processing executed by a unit for calculating a first degree of similarity.

Next, at step S205, through a procedure described later with reference to FIG. 4, the first degree of similarity calculating unit 108 calculates first degrees of similarity between (a) parameters and (b) metadata of respective ones of the computer systems and transmits the first degrees of similarity and a list of computer system candidates based thereon to the second degree of similarity calculating unit 109.

This is followed by step S206 where, through a procedure described later with reference to FIG. 5, the second degree of similarity calculating unit 109 revises the first degrees of similarity to second degrees of similarity based upon cost in a case where a command has been executed by each computer system, updates the list of computer system candidates based upon the second degrees of similarity and transmits the list to a command execution unit 107.

Finally, at step S207, through a procedure described later with reference to FIG. 3, the command execution unit 107 selects a computer system upon referring to the list of computer system candidates, transmits the commands and parameters to the selected computer system and transmits results of processing that have been received to the user terminal.

<Input Analyzing Unit 106>

The input analyzing unit 106 acquires a signal received via a computer network and checks to see whether the command execution unit 107 is waiting for an input at this time. If the command execution unit 107 is waiting for an input, the input analyzing unit 106 judges that the received signal is the result of processing a command and transmits the signal to the command execution unit 107 as is. If the command execution unit 107 is not waiting for an input, on the other hand, the input analyzing unit 106 judges that the received signal is an input from a user, separates the received signal into commands and parameters, transmits the commands to the first degree of similarity calculating unit 108 and transmits the parameters to the second degree of similarity calculating unit 109.

<Command Execution Unit 107>

The command execution unit 107 receives commands and parameters from the input analyzing unit 106, the list of computer system candidates from the second degree of similarity calculating unit 109, transmits a command to the appropriate computer system upon referring to the candidate list and receives results of execution from this computer system. The command execution unit 107 converts the format of the received results and transmits the results to the user.

The processing executed by the command execution unit 107 will be described with reference to FIG. 3.

It will be assumed that the set of computer system candidates for executing a command has been given with an order of priority by the time processing is executed by the command execution unit 107.

Figure 3:
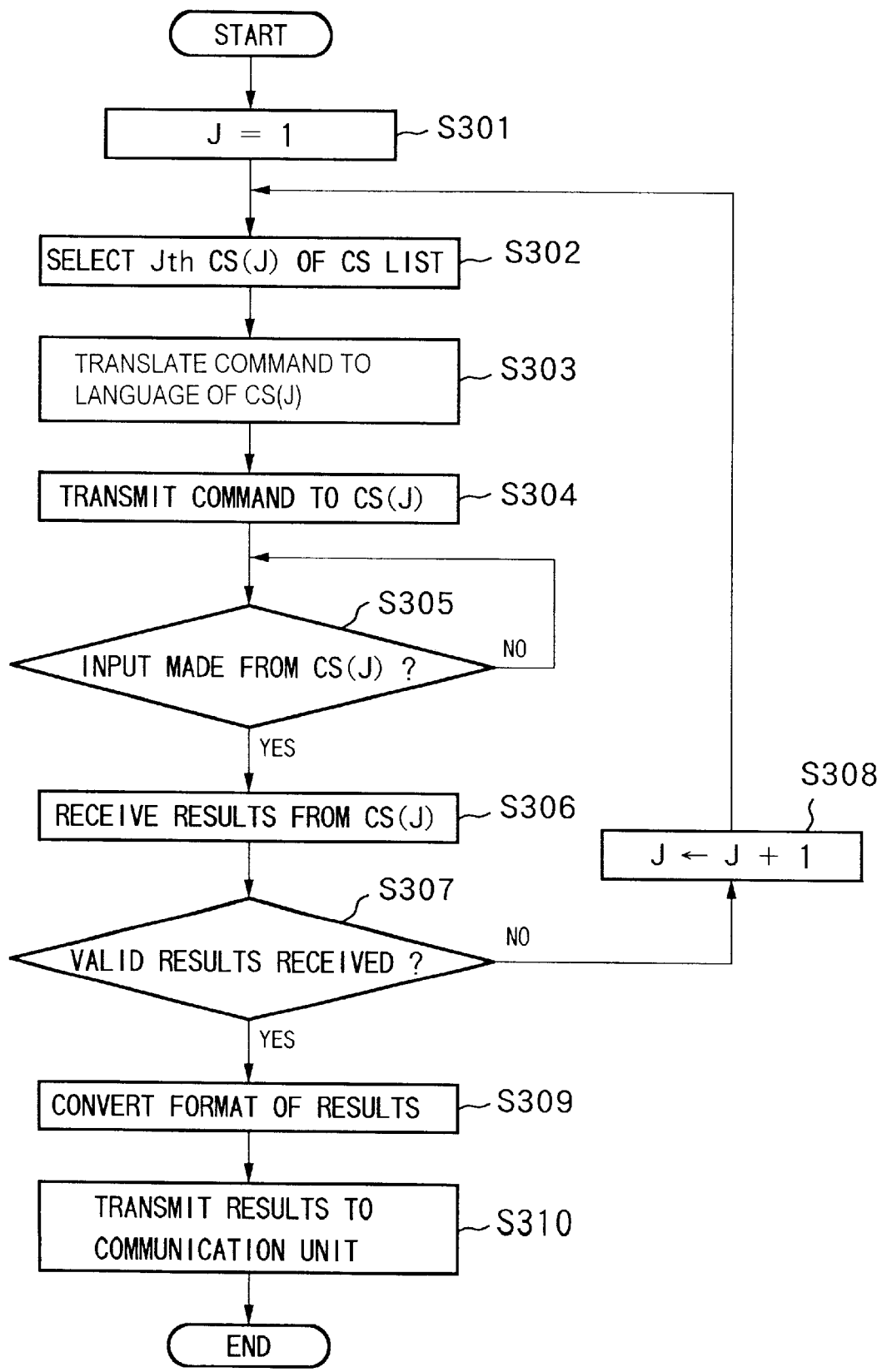
FIG. 3 is a flowchart illustrating processing executed by a command execution unit.

The setting J=1 is performed at step S301 in FIG. 3. A computer system CS (J) whose ranking in the candidate list is J is selected at step S302 and the language of the commands and parameters is converted to the language of the computer system CS(J) using the language translation library.

This is followed by step S304, at which the command execution unit 107 transmits the converted commands to the computer system CS(J), and then by step S305, at which the command execution unit 107 waits for an input from the computer system CS(J). The command execution unit 107 receives the results from the computer system CS (J) at step S306. The command execution unit 107 then determines whether the received results are valid. Control proceeds to step S208 if the results are not valid and to step S309 if the results are valid. The judgment regarding the validity of results is made based upon whether an error message is sent back or, in case of retrieval processing, whether there are zero results of processing.

The command execution unit 107 updates J to J+1 at step S308 and repeats the processing from step S302 to step S308.

Next, at step S309, the command execution unit 107 converts the format of the results of execution to the format employed by the system of the user and transmits the results of conversion to the user at step S310.

<First Degree of Similarity Calculating Unit 108>

The first degree of similarity calculating unit 108 uses the parameters extracted by the input analyzing unit 106 to order the computer systems capable of being accessed from the computer network. FIG. 4 is a flowchart representing the processing executed by the first degree of similarity calculating unit 108. The ordering processing performed by the first degree of similarity calculating unit 108 will be described with reference to FIG. 4.

At step S401 in FIG. 3 the first degree of similarity calculating unit 108 acquires the first transformation matrix A and second transformation matrix R calculated by the transformation matrix generating unit 110 through a procedure described later with reference to FIG. 6.

The unit 108 acquires N-number of parameters at step S402 and makes the setting J=1 and initializes the list of computer systems at step S403. The unit 108 then acquires a Jth parameter at step S404.

This is followed by step S405, at which the unit 108 transforms the parameter to an index vector $X_j^I$ using the LUT and then transforms $X_j^I$ to an M-vector $X_j^M$ by the following equation:

$$X_j^M = (AR)^T X_j^I \quad (1)$$

Figure 11:
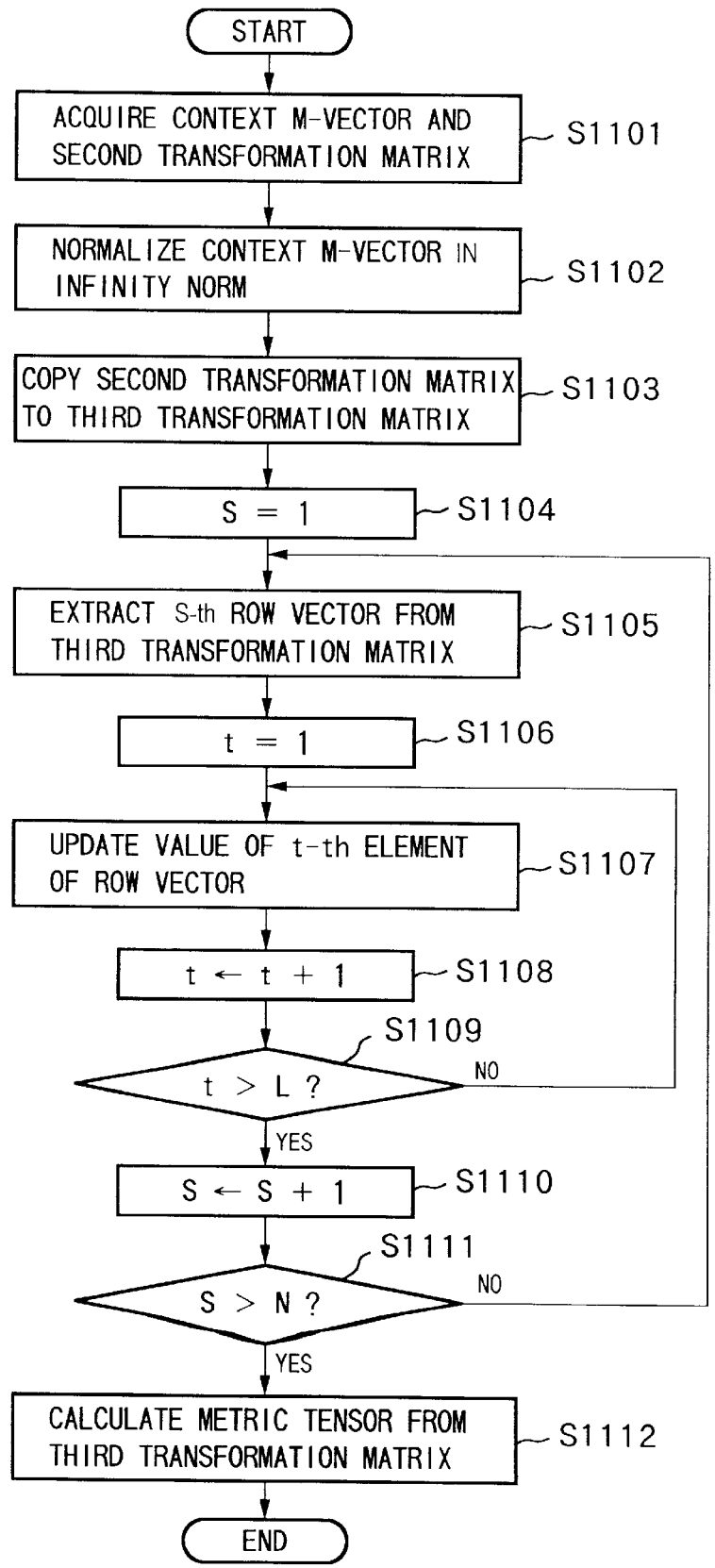
FIG. 11 is a flowchart of processing for calculating a metric tensor.

The unit 108 sets the M-vector to a context word at step S406. A metric tensor G is calculated at step S407 by a metric tensor calculation unit 111 through a procedure described later with reference to FIG. 11.

This is followed by step S408, at which an F-vector of metadata of resources contained in each computer system is set to data that is the object of comparison. It should be noted that metadata of a resource is data that expresses the resource by a linear combination of appropriate feature quantities, words or the like. Furthermore, metadata and the number of the computer system that contains this metadata are given in advance in the form of a correspondence table.

Next, at step S409, a norm is calculated in accordance with the following equation for every item of data that is the object of comparison:

$$\rho = (X^F)^T G X^F \quad (2)$$

where $X^T$ represents transposition of the vector X.

The data that is the object of comparison, namely the corresponding relationship between a resource and a parameter, is calculated based upon the magnitude of the norm when a parameter is adopted as context.

It is determined at step S410 whether comparison object data for which the norm exceeds a preset value exists. Control proceeds to step S414 if this data does not exist and to step S411 if it does. In other words, resources close in meaning to the parameter specified by the user are selected.

The list of computer system candidates is updated at step S411. More specifically, by using the correspondence table giving the correspondence between resources and computer system numbers, the list of computer system candidates is updated from the set of resources obtained at step S410. The list of candidates is rearranged sequentially in order of decreasing degree of similarity. The candidates are computer system IDs and resource IDs. The larger the norm for each parameter, the larger the value of the degree of similarity, as in the manner of the sum total or product of norms regarding parameters up to the Jth parameter.

At step S412, J is updated to J+1, then it is determined at step S413 whether J is greater than N. If the answer is "YES", processing is terminated; if the answer is "NO", the processing from step S405 to step S413 is repeated.

Error processing in a case where a relevant computer system does not exist is executed at step S414, after which processing is terminated.

<Second Degree of Similarity Calculating Unit 109>

The second degree of similarity calculating unit 109 uses the command extracted by the input analyzing unit 106 to order the computer systems capable of being accessed from the computer network. The processing performed by the second degree of similarity calculating unit 109 will be described with reference to FIG. 5.

Figure 5:
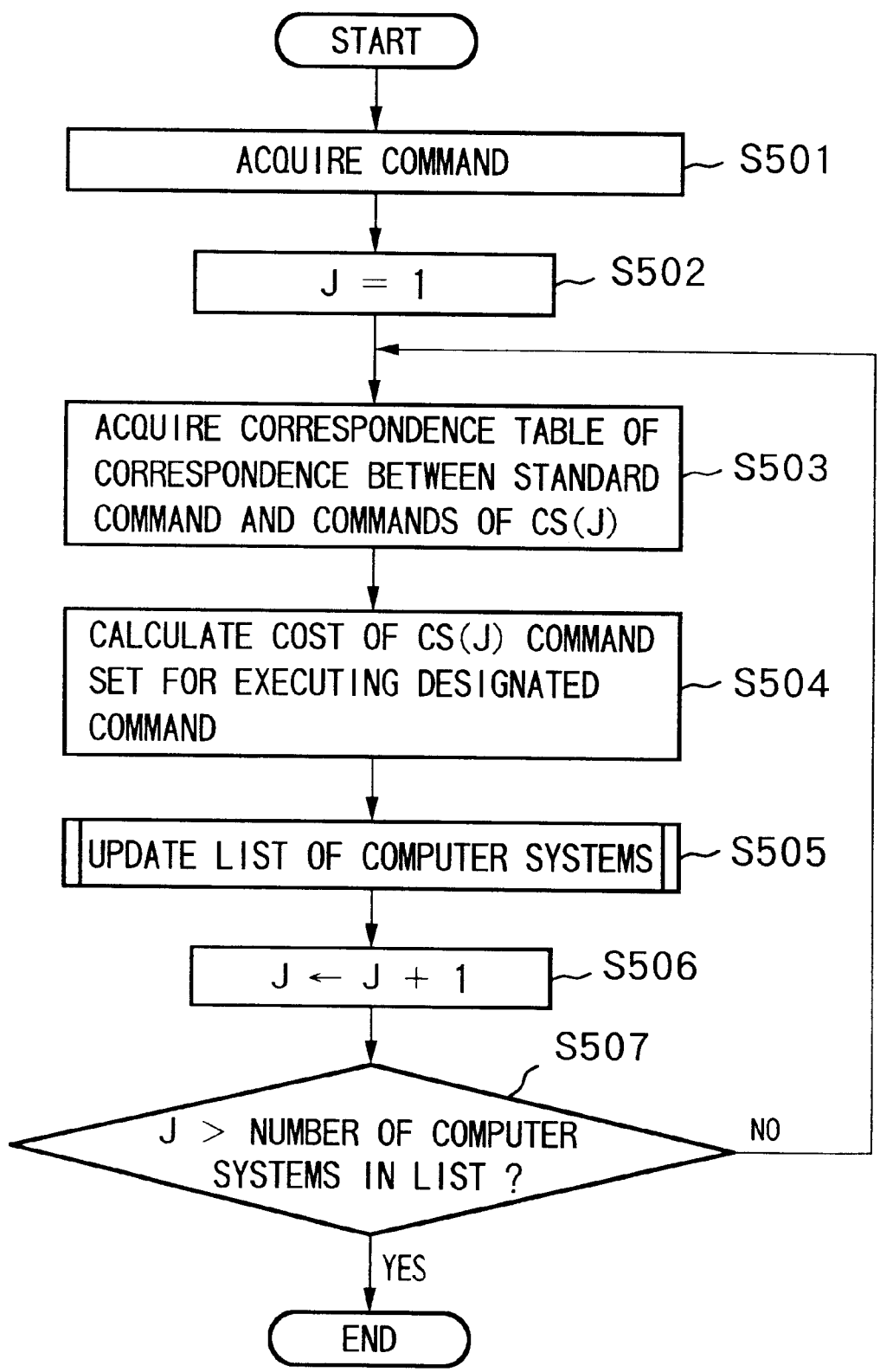
FIG. 5 is a flowchart illustrating processing executed by a unit for calculating a second degree of similarity.

At step S501 in FIG. 5 the second degree of similarity calculating unit 109 acquires a standard command name that has been specified by the user. This is followed by step S502, at which the unit 109 makes the setting J=1. Next, at step S503, the unit 109 uses a correspondence table to specify the address of a storage area storing information on the language being used by the computer system CS (J). The correspondence table, which has a format of the kind shown in FIG. 12 by way of example, will be described later.

At step S504, the unit 109 uses a command vs. cost table, classified by language, to specify the cost of using the computer system CS(J) for the command. The table has one address, which is the language information stored in the above-mentioned storage area. The format of the table, shown in FIG. 13 by way of example, will be described later.

The unit 109 updates J to J+1 at step S506 and then determines at step S507 whether H is greater than the number of candidates in the list. If the answer is "YES", processing is terminated; if the answer is "NO", the processing from step S503 to step S507 is repeated.

<Transformation Matrix Generating Unit 110>

The transformation matrix generating unit 110 generates the first and second transformation matrices using the basic dictionary 112. The flow of this processing will be described with reference to FIG. 6.

Figure 6:
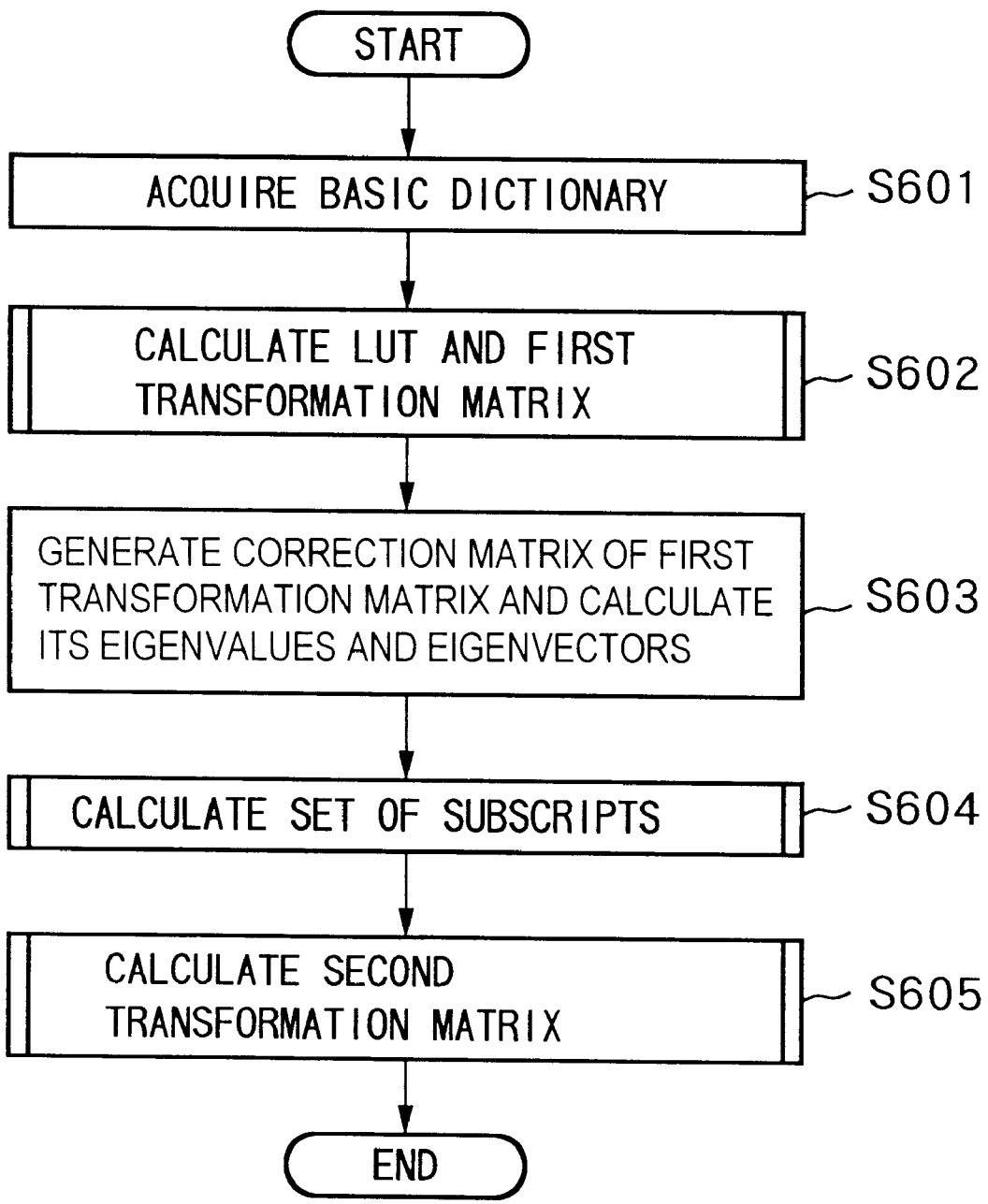
FIG. 6 is a flowchart illustrating processing executed by a transformation matrix generator.

The transformation matrix generating unit 110 acquires the basic dictionary 112 at step S601 in FIG. 6. Next, at step S602, the unit 110 calculates a LUT and the first transformation matrix by a calculation method described later in conjunction with FIG. 7.

With regard to the LUT, each word $w_j$ of a group of words entered as a set of K-number of words is converted to a format suited to computer processing. This shall be referred to as an I-vector hereinafter and written $w_j^I$. By way of example, the I-vector $w_j^I$ is expressed as shown in below. For instance, if the character string $w_j$="aback" appears as the eighth vocabulary entry in an English dictionary, then a K-dimension vector in which only the eighth element is 1 and the others are 0s is defined as the I-vector $w_j^I$:

$$w_j^I = (00000001 \ldots 0)^T \quad (3)$$

A correspondence table giving the correspondence between words serving as character strings and I-vectors is referred to as a LUT, which is stored in a memory device.

The transformation matrix generating unit 110 calculates and stores the first transformation matrix A at step S602. The first transformation matrix A is calculated as the outer product of $w_j^I$ and $w_j^F$ using Equation (4) or (5) below.

$$A = \sum_{j=1}^{j=K} w_j^I (w_j^F)^T \quad (4)$$

Alternatively, if the nth element of $w_j^I$ is written $w_{j,n^I}$, then we have $$A = \sum_{j=1}^{j=K} \begin{pmatrix} w_{j,1}^I \\ w_{j,2}^I \\ \vdots \\ w_{j,K}^I \end{pmatrix} (w_{j,1}^F w_{j,2}^F \ldots w_{j,N}^F) \quad (5)$$

where $(\cdot)^T$ represents transposition of the matrix. Further, $w_j^F$ is the F-vector of the word $w_j$. This is a vector generated by processing described later in connection with FIG. 8. The procedure for generating the first transformation matrix A will be described later in regard to FIG. 7. The first transformation matrix A is normalized in the 2-norm relating to the row vector.

Next, at step S603, the transformation matrix generating unit 110 generates a correlation matrix of the first transformation matrix and calculates the eigenvalues and eigenvectors of this matrix by, e.g., singular value decomposition:

$$A^T A = Q \text{diag}(\lambda) Q^T \quad (6)$$

where diag(x) is a diagonal matrix having the vector x as a diagonal element. Further, $\lambda$ and Q are given by the following equations using eigenvalues $\lambda_1, \lambda_2, \ldots, \lambda_N$ and the corresponding eigenvectors $q_1, q_2, \ldots, q_N$:

$$\lambda = (\lambda_1 \lambda_2 \ldots \lambda_N) T \quad (7)$$

$$Q = (q_1 q_2 \ldots q_N) \quad (8)$$

Since the correlation matrix is a diagonal matrix, its eigenvalues $\lambda_1, \lambda_2, \ldots, \lambda_N$ are all real numbers and the eigenvectors $q_1, q_2, \ldots, q_n$ corresponding to non-zero eigenvalues (assumed to be n in number) are mutually orthogonal.

Processing for calculating a subscript set $\Lambda$ is executed at step S604. The processing will be described later with reference to FIG. 9. The subscript set $\Lambda$ is a set of numbers of eigenvectors that satisfy certain conditions, and the number of elements is assumed to be (n-L). The transformation matrix generating unit 110 calculates the second transformation matrix R at step S605 using L-number of eigenvectors having subscripts not contained in this subscript set.

$$R = (q_1 q_2 \ldots) \quad (9)$$

The subscripts in Equation (9) differ from those that appear in Equation (8) and are the result of renumbering the subscripts belonging to the subscript set $\Lambda$.

Figure 7:
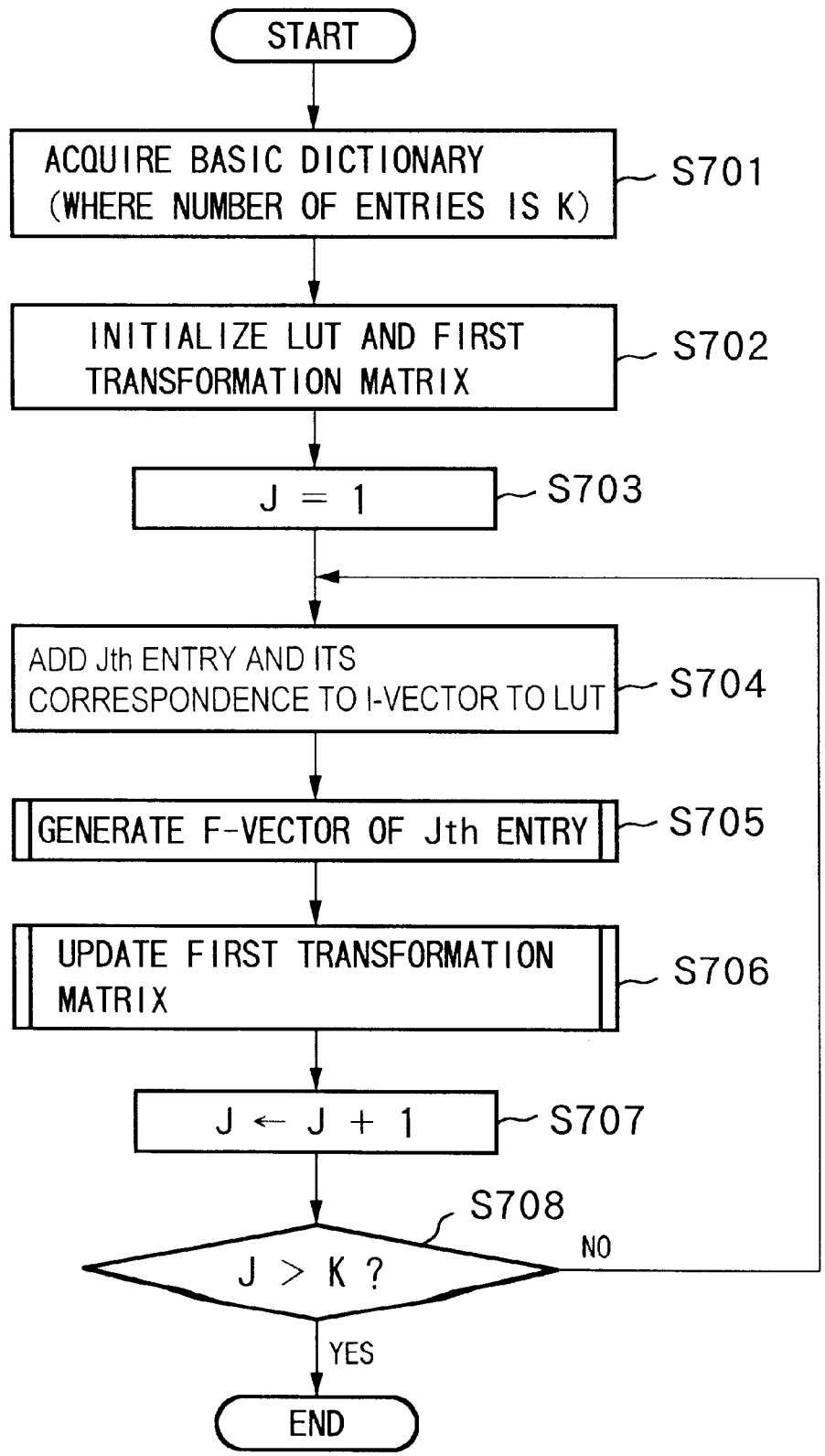
FIG. 7 is a flowchart of processing for calculating a LUT and a first transformation matrix.

The procedure for creating the LUT and first transformation matrix A at step S602 will be described in line with FIG. 7.

The basic dictionary is acquired at step S701. (The number of vocabulary entries is assumed to be K.) The LUT and first transformation matrix are initialized at step S702 and J is set to 1 at step S703. The correspondence between the Jth vocabulary entry and its I-vector is added to the LUT at step S704, then processing for generating the F-vector is executed at step S705. This processing will be described later with reference to FIG. 8. Updating of the first transformation matrix A is carried out at step S706. The updating processing is processing for calculating the sum of the products indicated by Equation (4) or (5). Next, J is updated to J+1 at step S707. This is followed by step S708, at which it is determined whether J is greater than K. If the answer is "YES", processing is terminated. If the answer is "NO", on the other hand, the processing from step S704 to step S708 is repeated.

Figure 8:
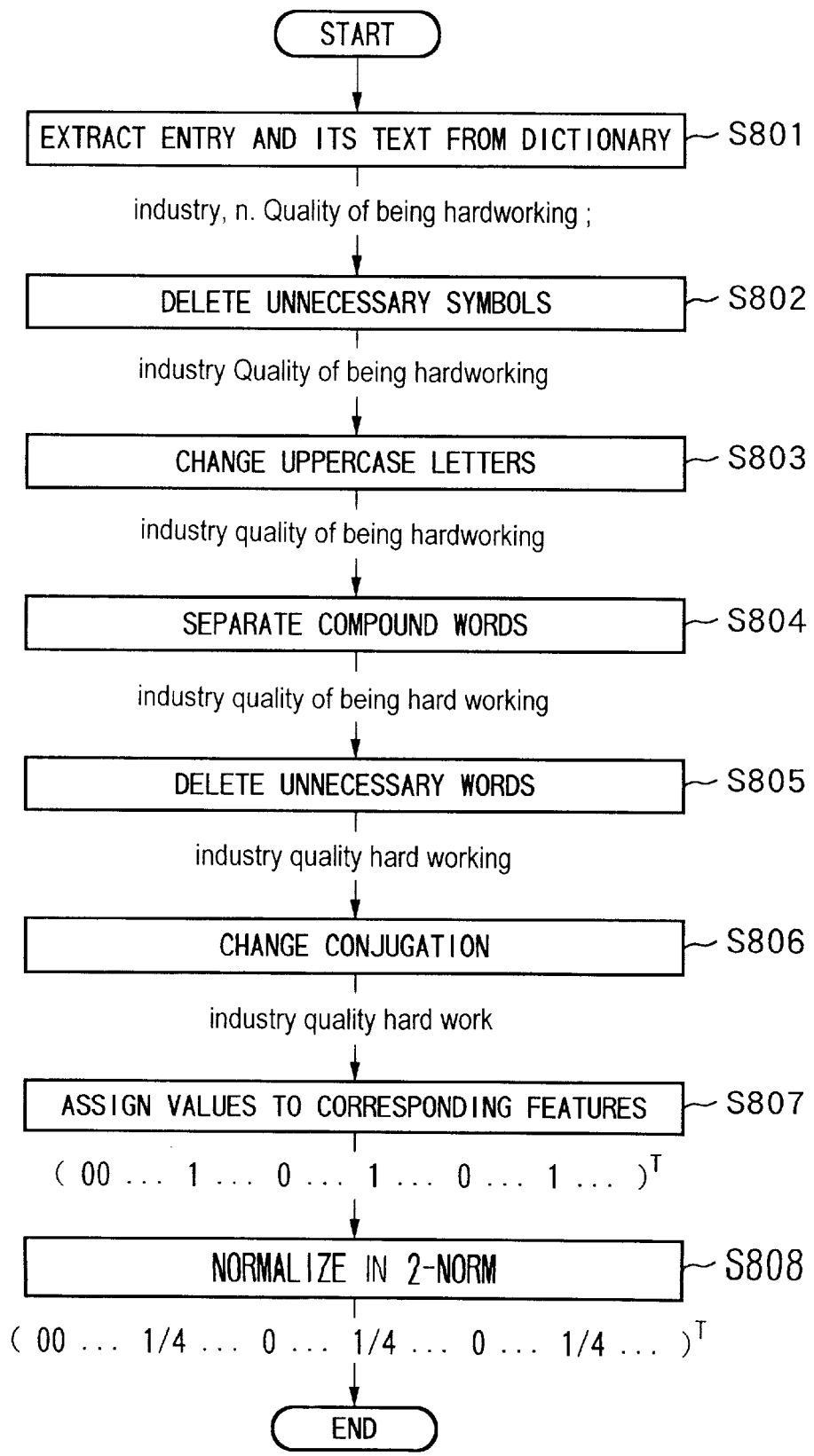
FIG. 8 is a flowchart of processing for generating the F-vector of a word.

FIG. 8 is a flowchart of the processing for generating the F-vector $w_j^F$ of the word $w_j$. The F-vector is a vector in representation space in which the basic word is the base. The term "basic word" here refers to about 2000 words in the Longman Dictionary of Contemporary English (abbreviated to "LDCE" below) or about 870 words in The General Basic English Dictionary (abbreviated to "GBED" below) used in order to explain vocabulary entries in the LDCE or GBED. The above-mentioned LDCE and GBED are examples of basic dictionaries 114.

By way of example, the F-vector for the word "industry" is generated as follows: First, at step S801 in FIG. 8, an entry and its text (meaning) are extracted from an English dictionary. As shown in FIG. 8, the entry is "industry" and the text is "n. Quality of being hardworking;". Unnecessary symbols are deleted at step S802. In FIG. 8, these symbols are ".", "n" and ".". Uppercase letters are changed to lowercase letters at step S803. Thus, "Q" is changed to "q" in FIG. 8. Compound words are separated at step S804; Thus, "hardworking" is broken up into the words "hard" and "working" in FIG. 8. This is followed by step S805, at which unnecessary words are deleted. In FIG. 8, the words "of" and "being" are deleted. Conjugation is changed at step S806. In FIG. 8, "working" is changed to "work". Next, a coefficient vector is generated by assigning values to corresponding features at step S807. Finally, the coefficient vector is subjected to 2-norm normalization to obtain the F-vector.

A method of generating the subscript set $\Lambda$ will now be described with reference to FIG. 9.

Figure 9:
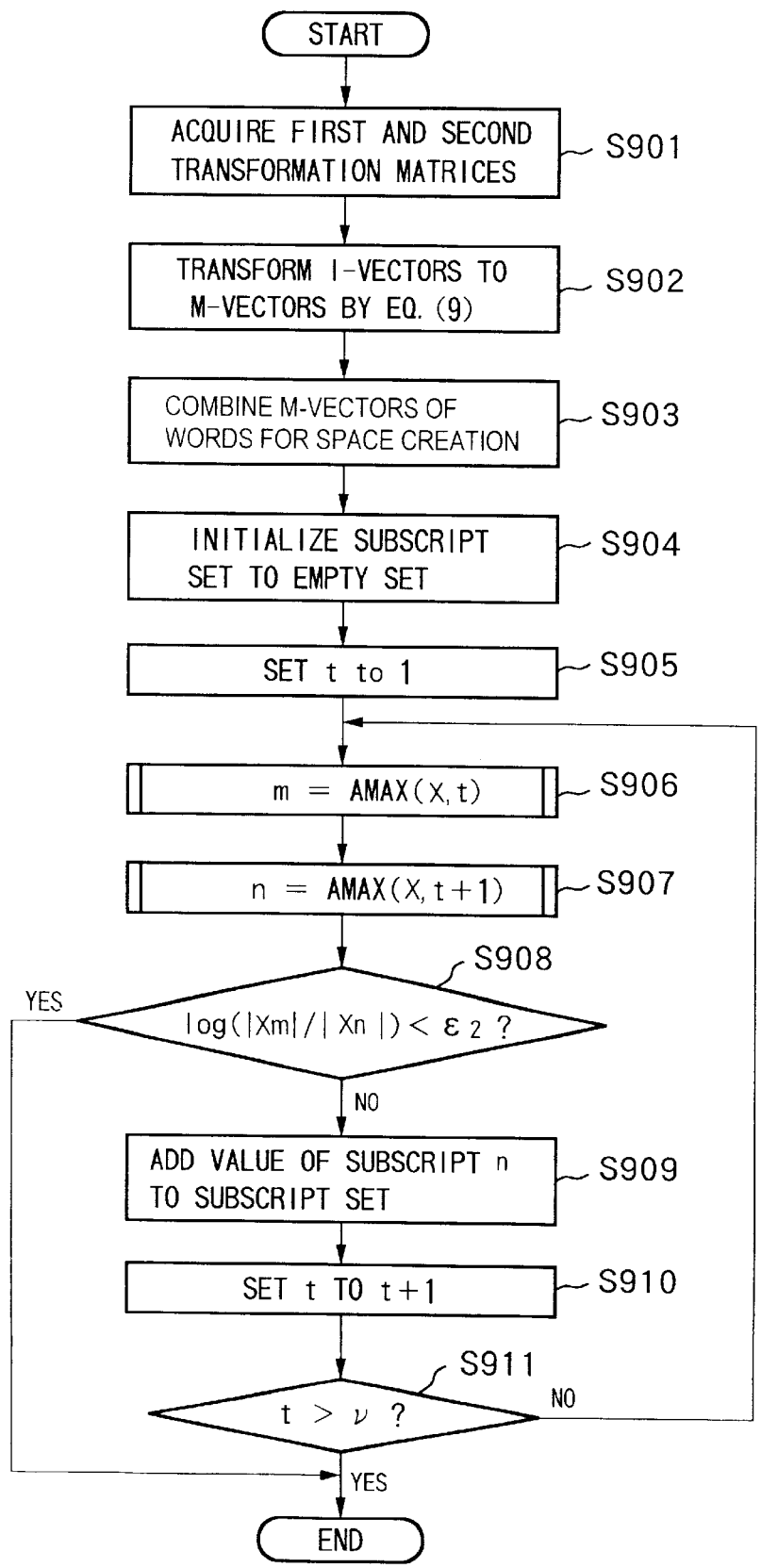
FIG. 9 is a flowchart of processing for generating a set of subscripts.

The first transformation matrix A and second transformation matrix R are acquired at step S901 in FIG. 9. Next, the I-vectors $X_j^I$ of all words for space creation (K in number) are transformed to M-vectors $X_j^M$ by the following equation at step S902:

$$X_j^M = (AR)^T X_j^I \qquad (10)$$

Next, the sum of the M-vectors $X_j^M$ of all of the words for space creation is calculated at step S903. This is performed in accordance with the following equation:

$$X = \sum_{j=1}^{j=K} X_j^M \qquad (11)$$

Figure 10:
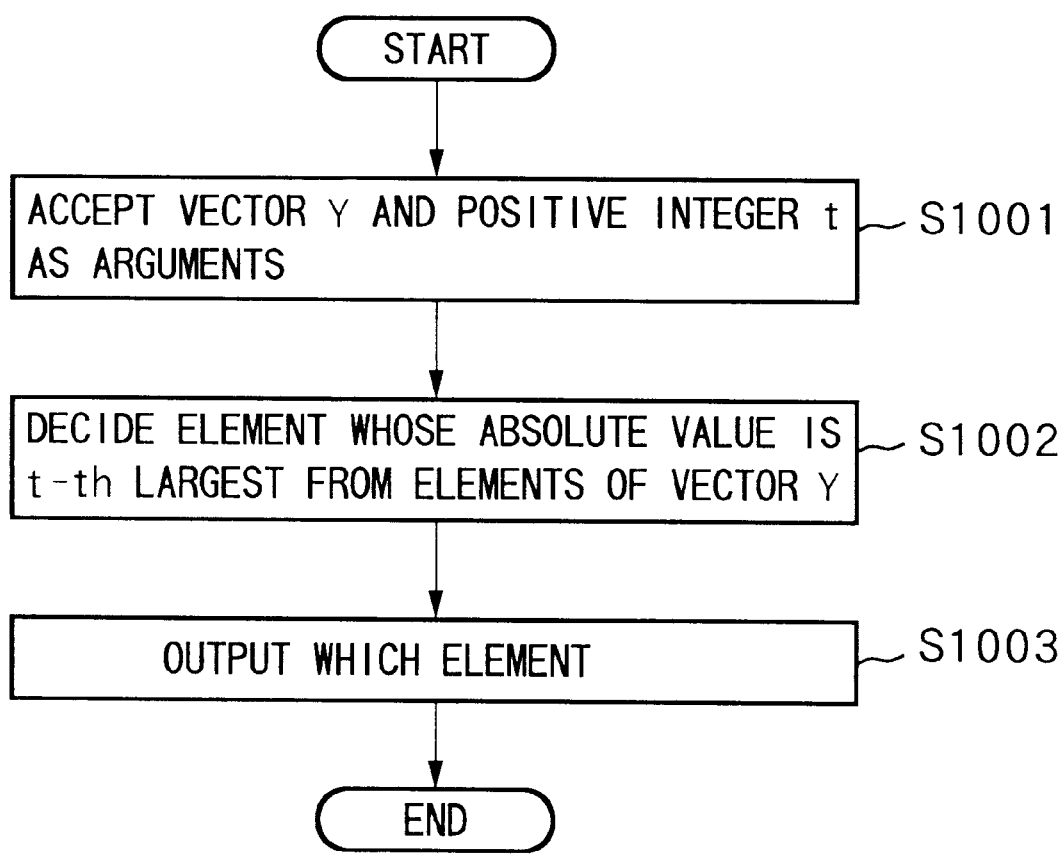
FIG. 10 is a flowchart of processing of a function AMAX.

This is followed by step S904, at which the subscript set $\Lambda$ is initialized to an empty set, and then by step S905, at which t is set to 1. Next, m is decided by the following equation at step S906:

$$n = AMAX(X,t) \qquad (12)$$

where AMAX(Y,t) is a function described later with reference to FIG. 10. Similarly, n is decided by the following equation at step S907:

$$n = AMAX(X,t+1) \qquad (13)$$

It is determined at step S908 whether the following value calculated using $X_m$ and $X_n$:

$$\log(|X_n|/|X_m|) \qquad (14)$$

is less than the positive real number $\epsilon_2$ set in advance. If the answer is "YES", processing is terminated. On the other hand, if the answer is "NO", step S909 is executed, i.e., a subscript n is added to the subscript set $\Lambda$. Next, t is set to t+1 at step S910. It is determined at step S911 whether processing has been executed for all elements of a v-dimension vector, i.e., whether t is greater than v. Processing is terminated if the answer is "YES" and processing is repeated from step S906 onward if the answer is "NO".

Processing involving AMAX(Y,t) will be described with reference to FIG. 10. The vector Y and positive integer t are acquired as arguments at step S1001. Next, from among the elements of vector Y, the element whose absolute value is the t-th largest is decided at step S1002. The number of this element (i.e., which particular element, consecutively speaking) is then output at step S1003.

<Metric Tensor Calculation Unit 111>

The metric tensor calculation unit 111 calculates a metric tensor using the first transformation matrix A and second transformation matrix R. The procedure of processing executed by the metric tensor calculation unit 111 will be described with reference to FIG. 11.

A context M-vector X and the second transformation matrix R are acquired at step S1101 and the context M-vector is normalized in an infinity norm at step S1102. The second transformation matrix R is copied to a third transformation matrix P at step S1103.

This is followed by step S1104, at which S is set to 1. Next, the Sth row vector $P(S,:) = [P(S,1), P(S,2), \ldots, P(S,L)]^T$ is extracted from the transformation matrix P at step S1105.

This is followed by step S1106, at which S is set to 1, and then by step S1107. Here P(S,t) and X(t) are compared and, if the signs differ, P(S,t) is updated to 0; otherwise, P(S,t) is updated to $\text{sign}[P(S,t)] |P(S,t) \cdot X(t)|$. Here sign(x) is a function that takes on the value −1 when x is negative and the value +1 when x is non-negative. Further, |x| represents the absolute value of x.

Steps S1107 to S1109 are repeated until t exceeds the number L of columns of the transformation matrix P. Steps S1105 to S1111 are repeated until S exceeds the number N of rows of the transformation matrix P. The metric tensor G is calculated by the following equation at step S1112:

$$G = P^T P \qquad (15)$$

<Computer System vs. Language Correspondence Table 113>

This is a table giving the correspondence between computer systems accessible from the computer network and information relating to command languages capable of being used by the computer systems. For example, as shown in FIG. 12, computer system names and the addresses (language information addresses) of storage areas storing language information generally are stored in 1:1 correspondence. FIG. 13 illustrates an example of language information.

<Command Cost Table 114>

An address of the command cost table 114 is given as one item of language information stored in the computer system vs. language correspondence table 113. An example thereof is illustrated in FIG. 14. When any command in the standard language specified by a user is executed in the command systems of each of the languages, there can be cases where the commands of the languages must be combined and executed a number of times. In such case the sum totals of the costs of each of the commands combined are defined as the cost and can be ranked in order of increasing cost, by way of example. It is possible to define cost in terms of time or money, etc.

<Libraries 115, 116, 117 for Translation to Language J>

These are libraries for making a translation from the standard language to language J. The address of a library is stored as one item of language information in the correspondence table 113 giving the correspondence between computer systems and languages. These translation libraries are functions in which the commands and parameters in the standard language are the arguments; they output, as character strings, descriptions of the commands and parameters in the language J.

In accordance with the first embodiment, as described above, one advantage is that even if a computer having desired resources is not specified accurately by the user, the desired resources can be utilized.

Further, even if a resource that perfectly matches the content of a user input does not exist, it is possible to select and utilize a computer having a resource close to the desired resource.

Further, when there are a plurality of computer candidates having required resources, the candidate for which the cost of executing a command is smallest is utilized preferentially to make possible the efficient execution of processing.

Second Embodiment

Figure 16:
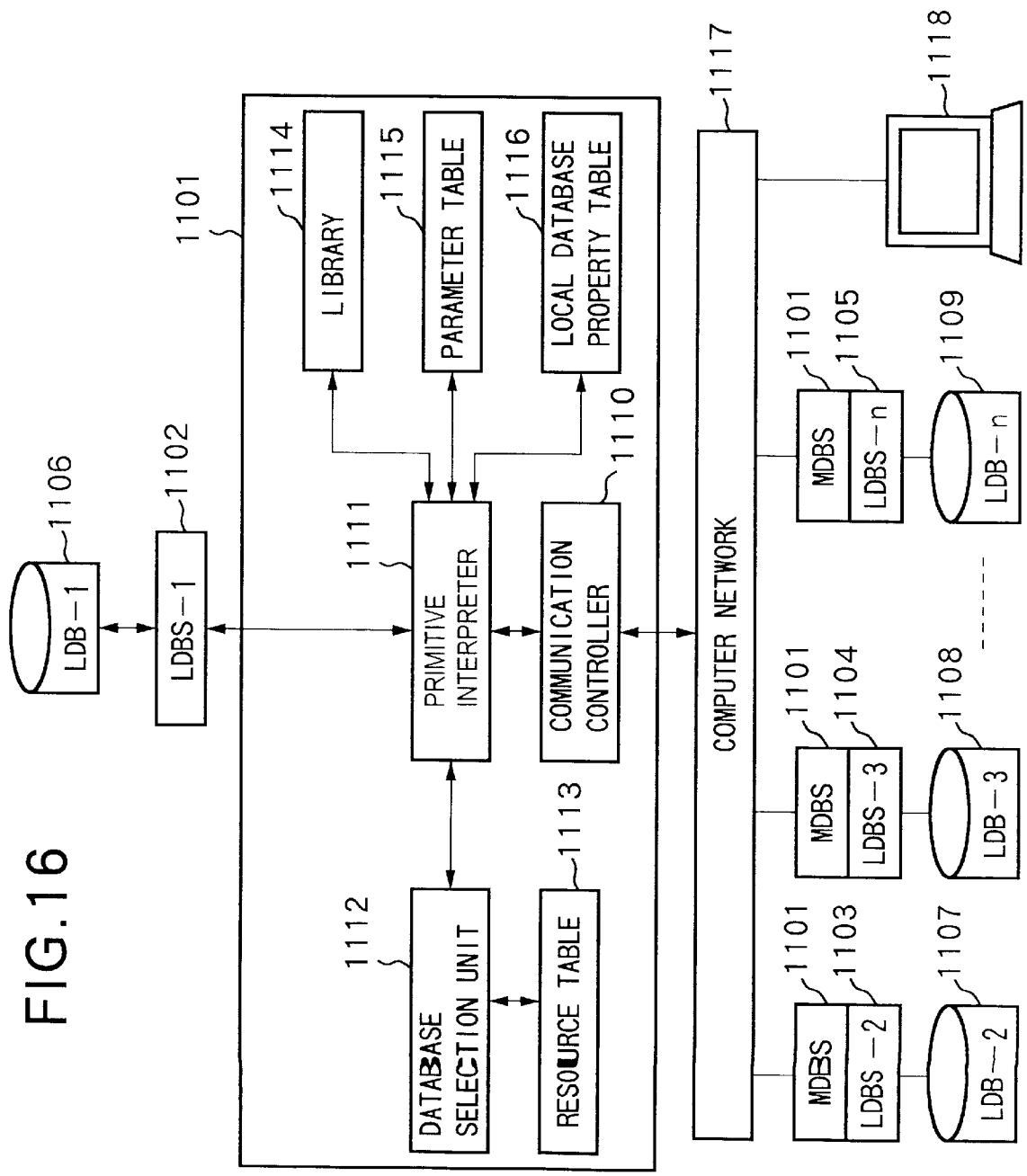
FIG. 16 is a functional block diagram showing a system for integrating different databases according to a second embodiment of the present invention.

FIG. 16 is a functional block diagram showing a system 1101 for integrating different databases according to a second embodiment of the present invention. As long as the components of the apparatus implement the functions described below, each component may be a device which includes a dedicated program memory and processor. Alternatively, a plurality of the functional components may be implemented by having the same CPU execute function programs that have been stored in a ROM or disk memory, etc., or a control program for controlling specific hardware that corresponds to each function.

The components shown in FIG. 16 will now be described.

<System 1101 for Integrating Different Databases>

The system 1101 for integrating different databases includes a communication controller 1110, a primitive interpreter 1111, a database selection unit 1112, a resource table 1113, a library 1114, a parameter table 1115, and a local database (LDB) property table 1116. The details of each of these components will be described later. The resource table 1113 is utilized by the database selection unit 1112, and the library 1114, parameter table 1115 and local database property table 1116 are utilized by the primitive interpreter 1111.

The hardware configuration of the information processing apparatus that functions as the integrated system 1101 of different databases is as described above in conjunction with FIG. 15 and need not be described-again.

<Local Database Systems and Local Databases>

Local database systems (LDBS-n) 1102–1105 are systems for managing local databases (LDB-n) 1106–1109. These analyze and execute query statements transmitted via a computer network 1117 and send back the results of processing. The local databases are relational databases or the like, and the local database systems are ordinary databases and database management systems implemented by SQL servers or the like.

<Communication Controller 1110>

The communication controller 1110 controls the sending and receiving of signals between the integrated system 1101 and computer network 1117 and includes middleware that supports multitasking and multiple users.

<Primitive Interpreter 1111>

The primitive interpreter 1111 converts script to primitives. The script is transmitted from a user terminal 1118 via the computer network 1117 and communication controller 1110. Script is a so-called high-level language and involves processing implemented by a combination of primitives.

Figure 17:
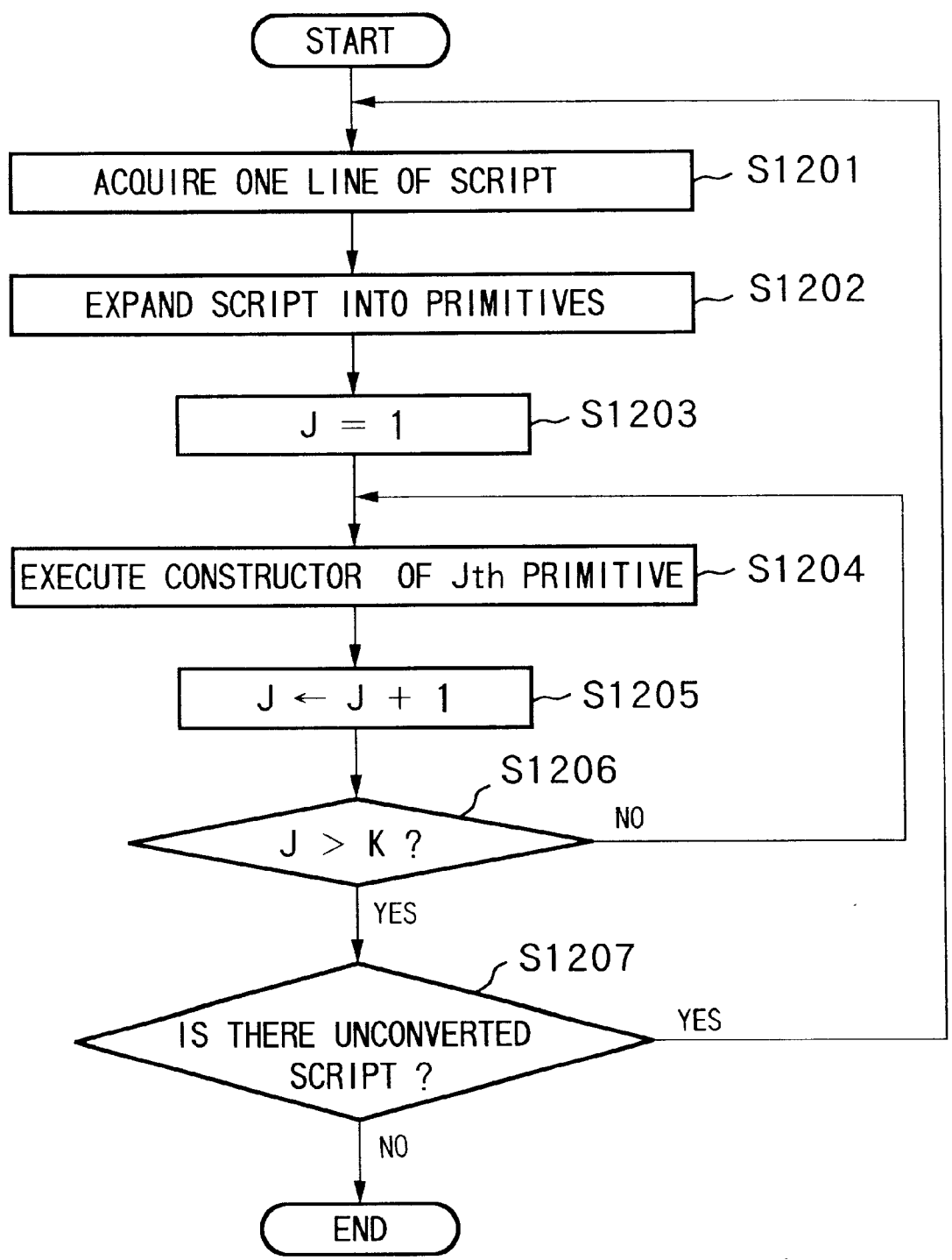
FIG. 17 is a flowchart showing processing executed by a primitive analyzing unit.

FIG. 17 is a flowchart illustrating the flow of processing executed by the primitive interpreter 1111 and will now be referred to in order to describe the flow of this processing.

One line of script is acquired at step S1201 in FIG. 17.

Next, at step S1202, the primitive interpreter 1111 expands the script into primitives based upon the library 1114 and reconstructs the arguments of each of the primitives from the arguments of the script. In the description that follows, it will be assumed that the number of primitives is K.

A primitive is implemented as an object which includes an argument list "arg", an internal variable referred to as operation mode variable "mode", and two methods referred to as a constructor "const ()" and an evaluator "eval ()". A primitive has no more than two arguments. The operation mode variable "mode" takes on the two values of "LAZY" and "EAGER". The constructor "const ()" is a method executed when a primitive has been declared, and the evaluator "eval ()" is a method of evaluating the return value of a primitive. The evaluator executes selection, projection and join, etc., which are basic operations in database retrieval.

The primitive interpreter 1111 sets J to 1 at step S1203 and executes the constructor of the Jth primitive at step S1204. As a result, the name of the Jth primitive is registered in the parameter table 1115 together with status of evaluation and the address of the local database in charge of evaluation.

The primitive interpreter 1111 updates J to J+1 at step S1205. Next, at step S1206, the primitive interpreter 1111 determines whether J is greater than K. If the answer is "YES", control proceeds to step S1207. If the answer is "No", on the other hand, processing from step S1204 to step S1206 is repeated. The processing of steps S1203 to S1206 will be described later with reference to FIG. 18.

The primitive interpreter 1111 determines at step S1207 whether any script to be converted remains. Processing is terminated if no such script remains and processing from step S1201 to step S1207 is repeated if script to be converted remains.

Figure 18:
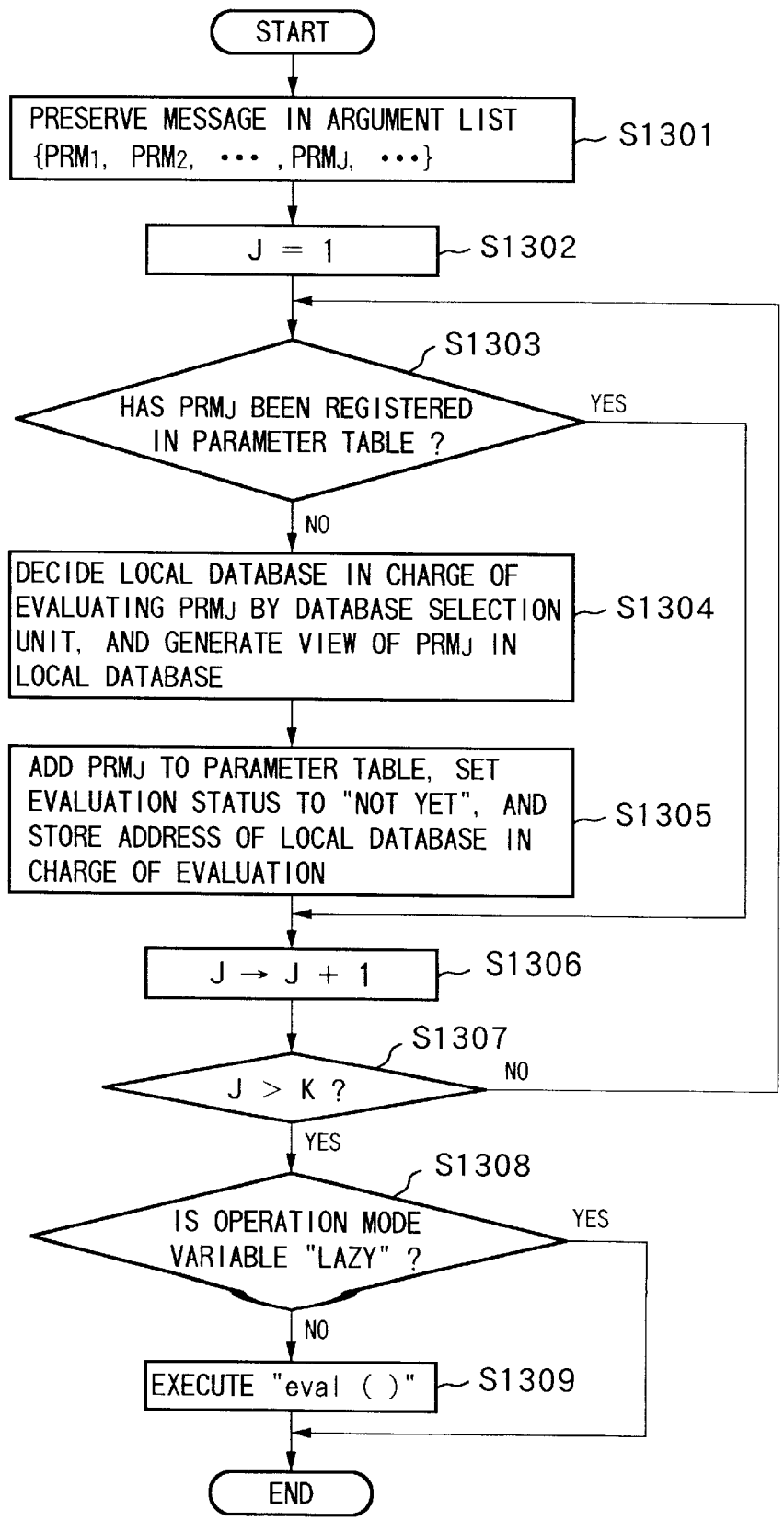
FIG. 18 is a flowchart illustrating processing executed by the constructor of a primitive.

The flow of processing by the constructor "const ()" will now be described with reference to FIG. 18.

A message is preserved in the argument list "arg" at step S1301. The argument list "arg" is given as a string of primitive names to be evaluated when a primitive is evaluated.

Next, J is set to 1 at step S1302. This is followed by step S1303, at which it is determined whether the name (written as $PRM_J$ below) of the Jth primitive has been registered in the parameter table 1115. Control proceeds to step S1306 if the answer is "YES" and to step S1304 if the answer is "NO".

At step S1304 the local database capable of evaluating $PRM_J$ is selected by the database selection unit 1112 with referring to the resource table 1113, the address of the selected local database is acquired using the local database property table 1116, and a command for generating a view of PRM$_J$ is transmitted to this local database. In response to this command, an argument is stored in the local database system in the format of the view. This is followed by step S1305, at which PRM$_J$ is added to the parameter table, the status of the evaluation is set to "NOT YET" and the address of the local database acquired as the address of the local database in charge of evaluation is set.

Next, J is updated to J+1 at step S1306 and it is determined at step S1307 whether J is greater than K. Control proceeds to step S1308 if the answer is "YES" and the processing of step S1303 to step S1307 is repeated if the answer is "NO".

It is determined at step S1308 whether the operation mode variable is "LAZY". If the answer is "YES", processing is terminated. If the answer is "NO", control proceeds to step S1309, at which the evaluator "eval ()" is executed.

Figure 19:
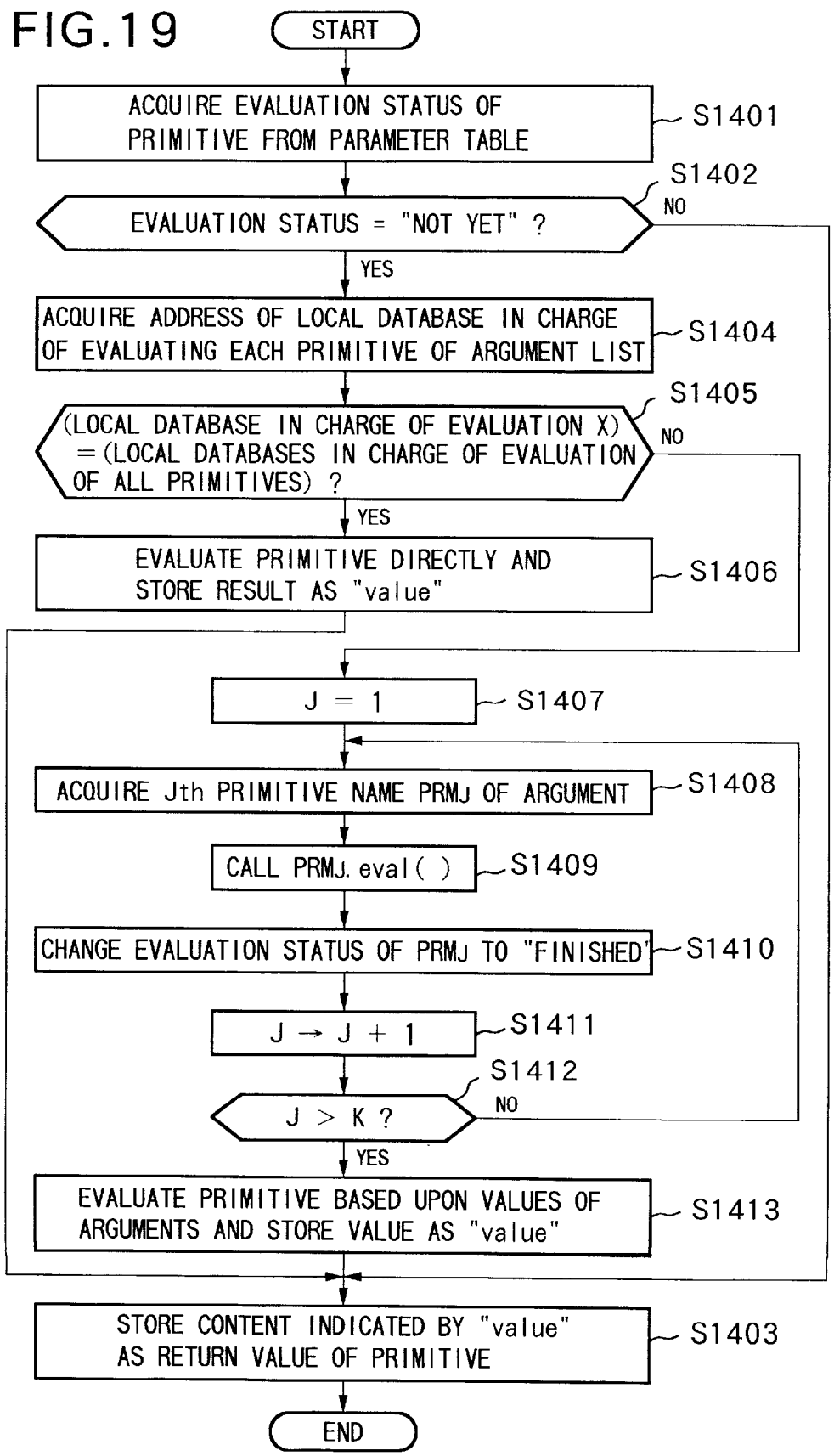
FIG. 19 is a flowchart illustrating processing executed by the evaluator of a primitive.

FIG. 19 is a flowchart showing the processing procedure of the evaluator "eval ()". The flow of processing of an evaluator "X.eval ()" of a primitive X will be described with reference to FIG. 19.

The evaluation status of the primitive X is acquired at step S1401 using the parameter table 1115. If the evaluation status of the primitive X is found to be "not yet" at step S1402, control proceeds to step S1404. If the status is found to be "finished", on the other hand, control proceeds to step S1403.

The addresses of local databases in charge of the evaluation of each of the primitives that have been stored in the argument list are acquired at step S1404.

If it is found at step S1405 that all of the acquired addresses of a local database in charge of evaluation are the same as those of the local database in charge of the evaluation of the primitive X, control proceeds to step S1406; otherwise, control proceeds to step S1407.

At step S1406, the local database in charge of evaluation of the arguments necessary to evaluate the primitive X is the same as the local database in charge of the evaluation of the primitive X. It is unnecessary, therefore, to evaluate these arguments individually. The reason for this is that by evaluating the primitive X directly, the arguments that have been stored in the view format in the local database system are evaluated automatically. Accordingly, the primitive X is evaluated directly, the result is stored as the content of a pointer "value", and control proceeds to step S1403.

Next, J is set to 1 at step S1407, the primitive name PRM$_J$ of Jth primitive of the argument list is acquired at step S1408 and PRM$_J$.eval () is executed at step S1409. The status of evaluation is changed to "finished" at step S1410. This is followed by step S1411, at which J is updated to J+1. It is then determined at step S1412 whether J is greater than K. Control proceeds to step S1413 if it is and processing from step S1408 to step S1412 is repeated if it is not.

The primitive is evaluated based upon the values of the arguments at step S1413. If there are two arguments, for example, X(PRM$_1$, PRM$_2$) are evaluated. More specifically, X(PRM$_1$, PRM$_2$) are translated to the language of the corresponding local database system and then transmitted to this local database system. The evaluator abandons the right to occupy the CPU at the moment query information, which includes information on the target local database, and information relating to the evaluator itself is transmitted to the communication controller 1110. The communication controller 1110 performs all inquiries based upon this query information, waits for responses from the local database and transmits the responses to the corresponding evaluator, based upon the information relating to the evaluator itself, in the order in which the responses were received. The evaluator stores, as the content of the pointer "value", the results received from this local database. Control then proceeds to step S1403.

Here the content indicated by the pointer "value" is stored as the return value of the primitive X. Processing then ends.

Special classes of primitives exist, namely free variable primitives and user primitives. In the case of a free variable primitive, the operation mode variable is "LAZY". For "const ()", a primitive name that has been received is set as its own function value "value". In the case of "eval ()", this function value "value" is returned. A free variable primitive is generated with respect to the of, e.g., "x=12" of the user script.

The operation mode variable of a user primitive is "EAGER". A partial inquiry for providing the final result of a retrieval query given by the user is expanded into user primitives. Accordingly, one user primitive will always be contained in a primitive string obtained by expanding the retrieval query of the user. Moreover, the result of the given retrieval query is obtained by evaluating the user primitive. Conversely, the evaluation of a primitive not related to the evaluation of a user primitive is unnecessary in terms of obtaining the result of a retrieval query. Further, since the operation mode variable of a user primitive is "EAGER", the evaluator "eval ()" of the user primitive is executed when the constructor "const ()" of the user primitive is executed.

<Database Selection Unit 1112>

The database selection unit 1112 refers to the resource table 1113 and sends back a list of databases in which the arguments PRM$_1$, PRM$_2$ of the primitive X are included as data. The correspondence between data names and lists of the names of databases which includes these data.

FIG. 20 is a flowchart illustrating the flow of retrieval processing. The flow of retrieval processing will be described with reference to FIG. 20 based upon the structural elements set forth above.

A retrieval query is transmitted from the user terminal 1118 to the integrated system 1101 of different databases at step S1501.

Next, the primitive interpreter 1111 expands the retrieval query, which is script, into primitives at step S1502 and executes the constructor of each primitive at step S1503.

This is followed by step S1504, at which a user primitive necessary for the result of the retrieval query is evaluated, and by step S1505, at which the result is transmitted to the user terminal.

In accordance with the second embodiment, as described above, it is possible to avoid unnecessary evaluation of procedures and data not needed to obtain the final result required by the user. As a result, communication traffic for evaluation can be reduced.

Furthermore, a partial inquiry to each database is stored in the database as a view, and a plurality of partial inquiries stored as these views are processed in one batch. This makes it possible to fully exploit the optimization function specified to each database.

Further, since execution of the evaluation of one primitive is controlled by execution of the evaluation of another primitive, it is unnecessary for the interpreter of primitives to perform scheduling of the primitives. As a result, designing of interpreters is facilitated and program size can be reduced.

Furthermore, a primitive possesses an operation mode variable, and whether or not evaluation of the primitive is to be executed is decided based upon this operation mode variable. As a result, it is possible to select lazy evaluation based upon evaluation in the applicative order.

Furthermore, the right to occupy a CPU is abandoned when query information, which includes information relating to a database in charge of evaluation, and information relating to a primitive that requested the query is transmitted to communication controller, all inquiries are made based upon this query information, responses from the database are awaited and, based upon the information relating to the primitive, responses are transmitted in the order in which they were received to evaluate the primitive. As a result, inquiries to a plurality of databases can be executed in parallel.

It should be noted that the object of the invention may be attained by supplying a storage medium storing the program codes of the software for performing the functions of the foregoing embodiments to an apparatus or system, reading the program codes with a computer of the system or apparatus from the storage medium, and then executing the program codes.

Furthermore, besides the case where the aforesaid functions according to the embodiments are implemented by executing the program codes read by a computer in the apparatus or system, the present invention covers a case where an operating system or the like running on the computer executes processing to implement the above-mentioned functions.

Furthermore, the present invention can be applied to a system comprising either a plurality of units or a single unit. It goes without saying that the present invention can be applied to a case where the objects of the invention are attained by supplying programs which execute the processing defined by the present system or invention.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus comprising:
   analyzing means for analyzing input information and extracting a parameter and a command;
   degree of similarity calculation means for calculating degrees of similarity between the parameter and feature quantities of respective ones of a plurality of utilizable computers;
   revision means for revising the degrees of similarity based upon correlation quantities between the command and respective ones of the plurality of utilizable computers;
   selection means for selecting a computer, which is suitable for processing the input information, from the plurality of utilizable computers on the basis of the degrees of similarity revised by said revision means; and
   control means for causing the computer selected by said selection means to execute the processing for the input information.

2. The apparatus according to claim 1, wherein the correlation quantities are costs entailed by executing processing, which is requested by the input information, by respective ones of the computers.

3. The apparatus according to claim 2, wherein the costs are those entailed when the command is executed in languages of the respective computers.

4. The apparatus according to claim 1, wherein said selection means selects computers in order of decreasing degree of similarity after revision; and
   said control means judges whether results of execution of processing by the selected computer are valid, and controls said selection means so as to select the next computer in the order if the results are invalid.

5. The apparatus according to claim 1, wherein said degree of similarity calculation means calculates degrees of similarity, in terms of meaning, between the parameter and the feature quantities of respective ones of the plurality of utilizable computers.

6. An information retrieval apparatus capable of utilizing a plurality of databases, comprising:
   expansion means for expanding an entered script-format retrieval query into one or more primitives which include a user primitive corresponding to a final result of the retrieval query, each primitive comprising a command and a parameter therefor;
   construction means for selecting a database that takes charge of evaluation in regard to each primitive obtained by expansion by said expansion means, and registering evaluation information which includes information specifying the database selected in regard to each primitive;
   evaluation means which refers to the evaluation information for evaluating a primitive using the database that is specified in the evaluation information for taking charge of evaluation of the primitive;
   control means for controlling said evaluation means in such a manner that only a primitive which is necessary in order to evaluate the user primitive is evaluated; and
   output means for outputting, as results of the retrieval query, results of evaluating the user primitive.

7. The apparatus according to claim 6, wherein said construction means instructs the database, which has been selected in relation to each primitive, to generate and hold a view that corresponds to the primitive.

8. The apparatus according to claim 6, wherein said construction means creates, as part of the evaluation information, information which specifies a primitive to be evaluated in order to evaluate each primitive; and
   said control means refers to the evaluation information and performs control in such a manner that a further primitive necessary to evaluate a primitive to be evaluated is evaluated.

9. The apparatus according to claim 8, wherein in a case where the evaluation information specifies databases such that a database that is in charge of evaluation of a primitive to be evaluated is identical with a database that is in charge of evaluation of a further primitive to be evaluated in order to evaluate the first-mentioned primitive, said control means inhibits evaluation of the further primitive.

10. The apparatus according to claim 6, wherein the primitive possesses an operation mode variable; and
    said construction means decides, based upon the operation mode variable, whether evaluation by said evaluation means is to be executed or not.

11. The apparatus according to claim 6, further comprising communication means for transmitting query information to each of the plurality of databases and receiving responses to the query information;
    wherein said evaluation means abandons a right to occupy a CPU when query information, which includes information relating to a database in charge of evaluation, and information relating to a primitive that requested the query information is transmitted to said communication means; and
    said communication means makes all of the queries based upon the query information, makes a transition to a state in which it waits for a response from a database and, on the basis of the information relating to the primitive, transmits responses in the order in which the responses were received in order to evaluate the primitive.

12. The apparatus according to claim 6, wherein said evaluation means registers in the evaluation information the fact that evaluation has been completed with respect to an evaluated primitive and refers to this evaluation information when an evaluation is performed, thereby avoiding re-evaluation of a primitive whose evaluation has been completed.

13. The apparatus according to claim 6, wherein said construction means examines whether evaluation information regarding a primitive that is currently the object of processing has already been registered and avoids re-registration of this evaluation information if this evaluation information has already been registered.

14. An information processing method comprising:
   an analyzing step of analyzing input information and extracting a parameter and a command;
   a degree of similarity calculation step of calculating degrees of similarity between the parameter and feature quantities of respective ones of a plurality of utilizable computers;
   a revision step of revising the degrees of similarity based upon correlation quantities between the command and respective ones of the plurality of utilizable computers;
   a selection step of selecting a computer,-which is suitable for processing the input information, from the plurality of utilizable computers on the basis of the degrees of similarity revised at said revision step; and
   a control step of causing the computer selected at said selection step to execute the processing for the input information.

15. The method according to claim 14, wherein the correlation quantities are costs entailed by executing processing, which is requested by the input information, by respective ones of the computers.

16. The method according to claim 15, wherein the costs are those entailed when the command is executed in languages of the respective computers.

17. The method according to claim 14, wherein said selection step selects computers in order of decreasing degree of similarity after revision; and
   said control step judges whether results of execution of processing by the selected computer are valid, and controls said selection step so as to select the next computer in the order if the results are invalid.

18. The method according to claim 14, wherein said degree of similarity calculation step calculates degrees of similarity, in terms of meaning, between the parameter and the feature quantities of respective ones of the plurality of utilizable computers.

19. An information retrieval method capable of utilizing a plurality of databases, comprising:
   an expansion step of expanding an entered script-format retrieval query into one or more primitives which include a user primitive corresponding to a final result of the retrieval query, each primitive comprising a command and a parameter therefor;
   a construction step of selecting a database that takes charge of evaluation in regard to each primitive obtained by expansion at said expansion step, and registering evaluation information which includes information specifying the database selected in regard to each primitive;
   an evaluation step of referring to the evaluation information and evaluating only a primitive which is necessary in order to evaluate the user primitive using the database that is specified in the evaluation information for taking charge of evaluation of the respective primitive; and
   an output step of outputting, as results of the retrieval query, results of evaluating the user primitive.

20. The method according to claim 19, wherein said construction step instructs the database, which has been selected in relation to each primitive, to generate and hold a view that corresponds to the primitive.

21. The method according to claim 19, wherein said construction step creates, as part of the evaluation information, information which specifies a primitive to be evaluated in order to evaluate each primitive; and
   said evaluation step refers to the evaluation information and evaluates a further primitive necessary to evaluate a primitive to be evaluated.

22. The method according to claim 21, wherein in a case where the evaluation information specifies databases such that a database that is in charge of evaluation of a primitive to be evaluated is identical with a database that is in charge of evaluation of a further primitive to be evaluated in order to evaluate the first-mentioned primitive, said control step inhibits evaluation of the further primitive.

23. The method according to claim 19, wherein the primitive possesses an operation mode variable; and
   said construction step decides, based upon the operation mode variable, whether evaluation by said evaluation step is to be executed or not.

24. The method according to claim 19, further comprising a communication step of transmitting query information to each of the plurality of databases and receiving responses to the query information;
   wherein said evaluation step abandons a right to occupy a CPU when query information, which includes information relating to a database in charge of evaluation, and information relating to a primitive that requested the query information is transmitted to said communication step; and
   said communication step makes all of the queries based upon the query information, makes a transition to a state in which it waits for a response from a database and, on the basis of the information relating to the primitive, transmits responses in the order in which the responses were received in order to evaluate the primitive.

25. The method according to claim 19, wherein said evaluation step registers in the evaluation information the fact that evaluation has been completed with respect to an evaluated primitive and refers to this evaluation information when an evaluation is performed, thereby avoiding re-evaluation of a primitive whose evaluation has been completed.

26. The method according to claim 19, wherein said construction step examines whether evaluation information regarding a primitive that is currently the object of processing has already been registered and avoids re-registration of this evaluation information if this evaluation information has already been registered.

27. A storage medium storing an information processing program executed by a computer, said information processing program having:
   program code of an analyzing step of analyzing input information and extracting a parameter and a command;

program code of a degree of similarity calculation step of calculating degrees of similarity between the parameter and feature quantities of respective ones of a plurality of utilizable computers;

program code of a revision step of revising the degrees of similarity based upon correlation quantities between the command and respective ones of the plurality of utilizable computers;

program code of a selection step of selecting a computer, which is suitable for processing the input information, from the plurality of utilizable computers on the basis of the degrees of similarity revised at said revision step; and program code of a control step of causing the computer selected at said selection step to execute the processing for the input information.

28. A storage medium storing an information retrieval program executed by a computer, said information retrieval program having:

program code of an expansion step of expanding an entered script-format retrieval query into one or more primitives which include a user primitive corresponding to a final result of the retrieval query, each primitive comprises a command and a parameter therefor;

program code of a construction step of selecting a database that takes charge of evaluation in regard to each primitive obtained by expansion at said expansion step, and registering evaluation information which includes information specifying the database selected in regard to each primitive;

program code of an evaluation step of referring to the evaluation information and evaluating only a primitive necessary in order to evaluate the user primitive using the database that is specified in the evaluation information for taking charge of evaluation of respective primitive; and program code of an output step of outputting, as results of the retrieval query, results of evaluating the user primitive.

* * * * *

UNITED STATES PATENT AND TRADEMARK OFFICE
CERTIFICATE OF CORRECTION

PATENT NO. : 6,347,315 B1  Page 1 of 1
DATED : February 12, 2002
INVENTOR(S) : Kiyoki et al.

It is certified that error appears in the above-identified patent and that said Letters Patent is hereby corrected as shown below:

Column 2,
Line 43, "-in" should read -- in --;
Line 46, "an" should read -- a --; and
Line 67, "of-procedures" should read -- of procedures --.

Column 8,
Line 52, "R=($q_1q_2$...)" should read -- R=($q_1q_2$...$q_L$) --.

Column 9,
Line 27, "step S804;" should read -- step S804. --.

Column 11,
Line 58, "described-again" should read -- described again --.

Column 14,
Line 12, "to the of," should read -- to the "x" of, --.

Column 17,
Line 28, "-which" should read -- which --.

Signed and Sealed this

First Day of July, 2003

JAMES E. ROGAN
*Director of the United States Patent and Trademark Office*